United States Patent
Morimoto et al.

(10) Patent No.: US 8,310,984 B2
(45) Date of Patent: Nov. 13, 2012

(54) CONTROLLER, MOBILE STATION, MOBILE COMMUNICATIONS SYSTEM AND CONTROL METHOD

(75) Inventors: Akihito Morimoto, Yokohama (JP); Kenichi Higuchi, Yokohama (JP); Sadayuki Abeta, Yokohama (JP); Mamoru Sawahashi, Yokohama (JP)

(73) Assignee: NTT Docomo, Inc., Tokyo (JP)

( * ) Notice: Subject to any disclaimer, the term of this patent is extended or adjusted under 35 U.S.C. 154(b) by 1015 days.

(21) Appl. No.: 11/909,635

(22) PCT Filed: Mar. 27, 2006

(86) PCT No.: PCT/JP2006/306111
§ 371 (c)(1),
(2), (4) Date: Dec. 1, 2008

(87) PCT Pub. No.: WO2006/106615
PCT Pub. Date: Oct. 12, 2006

(65) Prior Publication Data
US 2009/0201876 A1 Aug. 13, 2009

(30) Foreign Application Priority Data

Mar. 31, 2005 (JP) .................................. 2005-105496
Aug. 23, 2005 (JP) .................................. 2005-241903

(51) Int. Cl.
*H04W 4/00* (2009.01)
(52) U.S. Cl. ........................................ 370/328; 370/338
(58) Field of Classification Search .................. 370/338, 370/328
See application file for complete search history.

(56) References Cited

U.S. PATENT DOCUMENTS

| | | | | |
|---|---|---|---|---|
| 6,804,216 | B1 * | 10/2004 | Kuwahara et al. | ............ 370/335 |
| 6,804,217 | B1 * | 10/2004 | Miyatani et al. | ............. 370/335 |
| 7,031,664 | B2 * | 4/2006 | Lee et al. | ................... 455/67.13 |
| 2003/0002460 | A1 | 1/2003 | English | |
| 2003/0171118 | A1 * | 9/2003 | Miya | ............................. 455/442 |
| 2004/0095902 | A1 * | 5/2004 | Laroia et al. | .................. 370/328 |
| 2007/0140178 | A1 * | 6/2007 | Jung et al. | ..................... 370/335 |
| 2008/0063116 | A1 * | 3/2008 | Yokoyama | .................... 375/299 |

FOREIGN PATENT DOCUMENTS

| | | |
|---|---|---|
| EP | 1056219 | * 12/2000 |
| EP | 1853074 A1 | 11/2007 |
| JP | 10-327450 | 12/1998 |
| JP | 11-069416 | 3/1999 |
| JP | 2000-341193 | 12/2000 |

(Continued)

OTHER PUBLICATIONS

Extended European Search Report for Application No. 06730059.0, mailed on Apr. 23, 2012 (10 pages).

(Continued)

*Primary Examiner* — Sai-Ming Chan
(74) *Attorney, Agent, or Firm* — Osha Liang LLP

(57) ABSTRACT

A disclosed control apparatus performs packet communications with a mobile station and divides a coverage area into plural sectors so as to control the communications. The control apparatus comprises a transmission allocation portion that selects at least two transmission sectors to perform transmission to the mobile station in accordance with reception quality imparted from the mobile station so as to perform a transmission allocation for the mobile station; and a transmission portion that uses an identical scramble code for sector identification so as to perform transmission to the mobile station.

14 Claims, 22 Drawing Sheets

FOREIGN PATENT DOCUMENTS

WO    02/102109    12/2002

OTHER PUBLICATIONS

D. Zhao, et al., "Effect of Soft Handoff on Packet Transmissions in Cellular CDMA Downlinks," IEEE ISPAN 04, pp. 42-47, May 2004 (6 pages).

M. Kazmi, et al., "Scheduling Algorithms for Soft Handoff in Cellular Packet CDMA," IEEE PIMRC2000, pp. 671-675, Sep. 2000 (5 pages).

3GPP TR25.848 v4.0.0, Technical Report; 3rd Generation Partnership Project; Technical Specification Group Radio Access Network; Physical layer aspects of UTRA High Speed Downlink Packet Access (Release 4), Mar. 2001 (88 pages).

A. Jalali, et al., "Data Throughput of CDMA-HDR a High Efficiency-High Data Rate Personal Communication Wireless System," IEEE VTC2000, pp. 1854-1858, 2000 (5 pages).

International Search Report issued in International Application No. PCT/JP2006/306111, mailed on Jul. 18, 2006 (2 pages).

\* cited by examiner

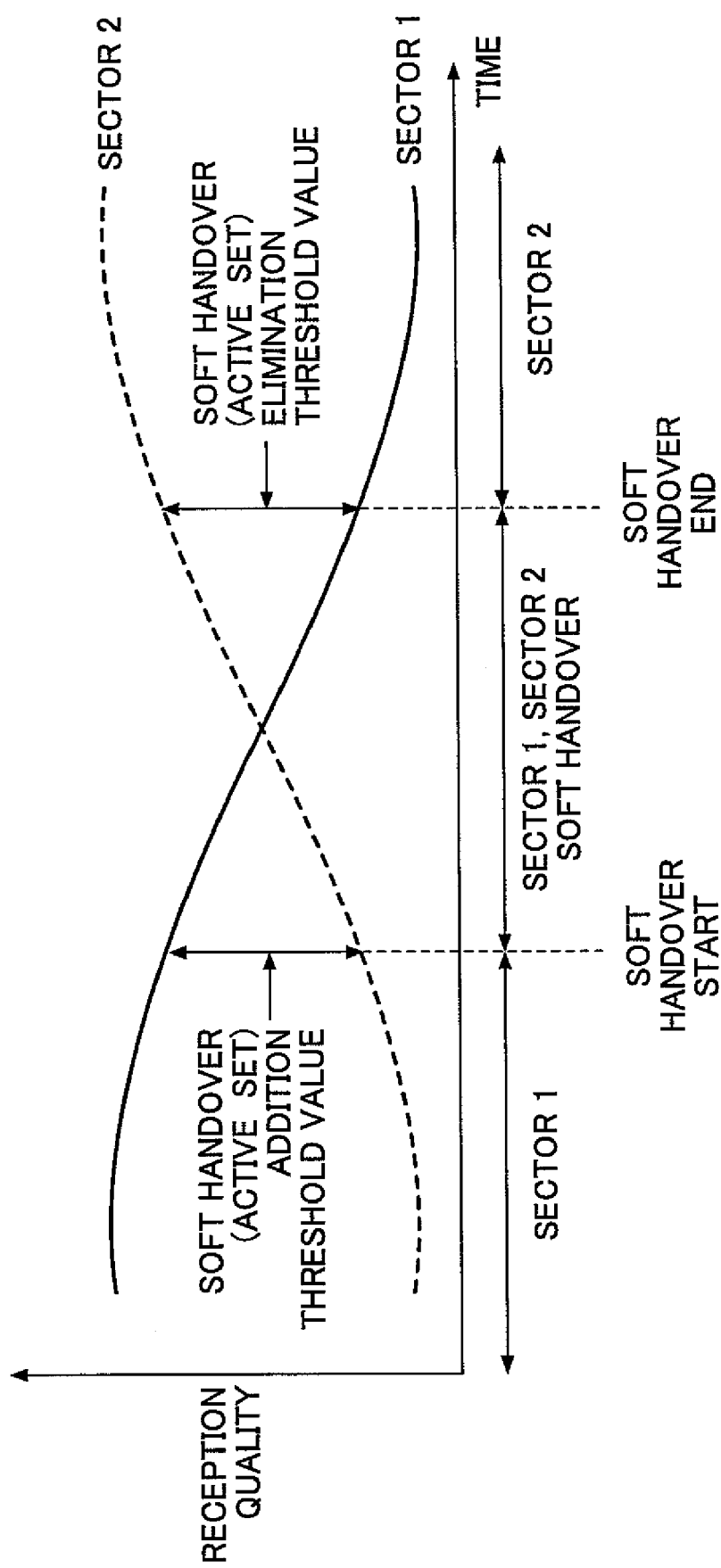

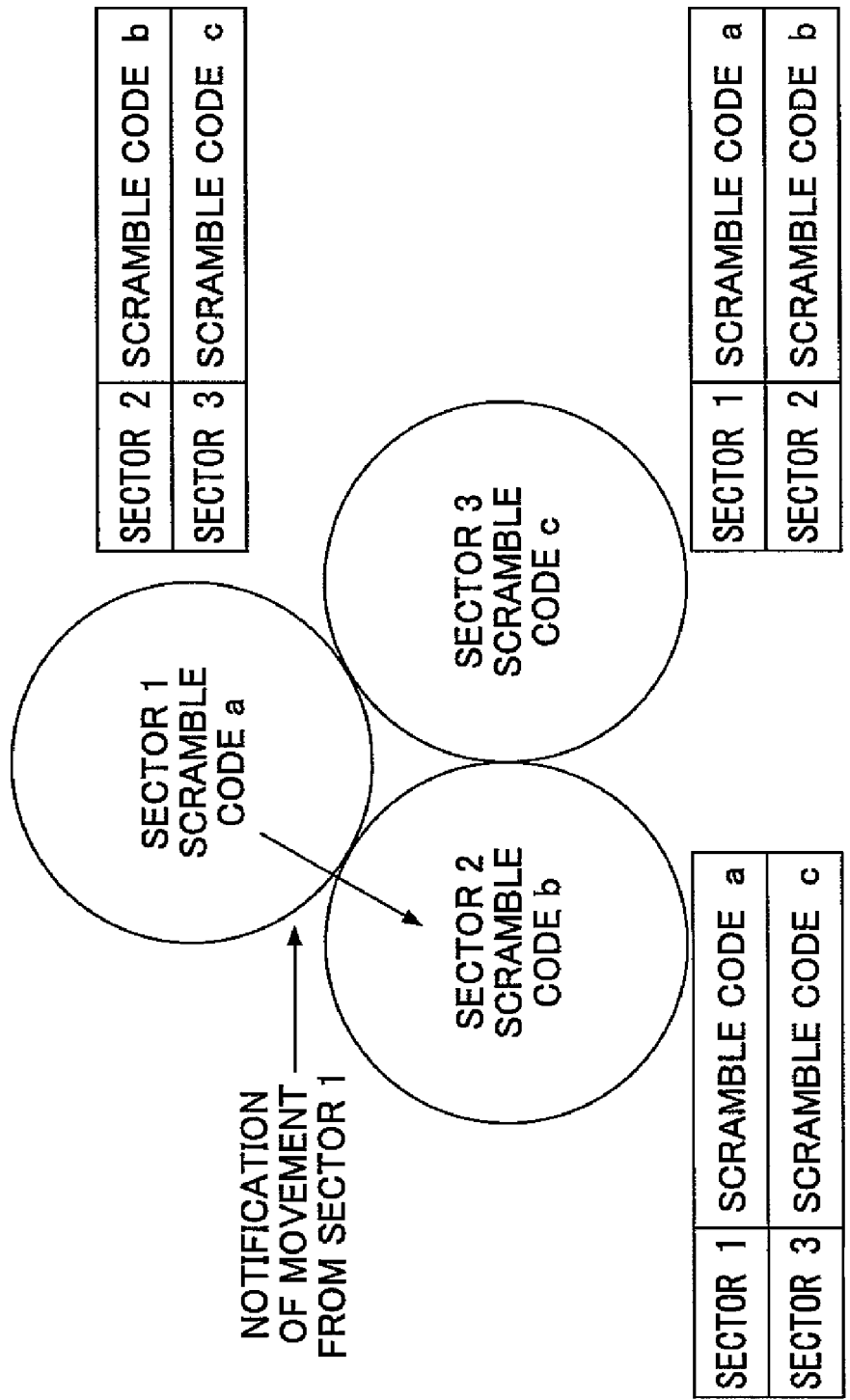

ated art.
CONTROLLER, MOBILE STATION, MOBILE COMMUNICATIONS SYSTEM AND CONTROL METHOD

TECHNICAL FIELD

The present invention relates to a control apparatus, a mobile station, a mobile communications system, and a control method.

BACKGROUND ART

When soft handover is employed in a line switching system, scheduling is not carried out since dedicated channels are at any time established with plural cells (sectors).

In a 4th Generation (4G) mobile system, all the communications are carried out through packets. In such packet communications, a shared channel is provided and time divisional control is employed in such a manner, for example, that the channel is allocated to a user 1 for a moment and to a user 2 for the next moment. Therefore, when soft handover is carried out between sectors, the transmissions to a user cannot be carried out unless the allocations are simultaneously carried out in both sectors.

Therefore, an algorithm for fast packet scheduling in soft handover over plural sectors is required.

The scheduling algorithm when handover is carried out includes, for example, an algorithm that enables scheduling only in one connected cell (sector) as the algorithm for scheduling when hard handover is carried out. While connection with either one of the users is established at a certain moment, the user moves to the next sector at a certain moment. Here, connection is made only to one cell (sector) at a certain moment, which means one link is kept. In this case, the cell (sector) in which scheduling is carried out is changed by such a handover. Namely, control over plural cells (sectors) is not required and control which is the same as the scheduling that does not take account of handover is carried out.

In addition, as the scheduling when soft handover is carried out, there is an algorithm that enables scheduling that takes account of a traffic class in an upper station (see non-patent documents 1, 2). For example, when there are two base stations and an upper station that controls these two base stations, it is the upper station that carries out the scheduling.

In addition, when soft handover is carried out in W-CDMA, plural sectors transmit simultaneously using different scramble codes for identifying sectors. A mobile station performs despreading on the signals transmitted from the sectors using scramble codes corresponding to the sectors and synthesizes the despread signals.

When different data are transmitted from two sectors using identical scramble codes, the mobile station receives the two transmission signals. However, the two signals are mixed and the two pieces of data transmitted from the two sectors cannot be identified.

Non-patent document 1: D. Zhao, "Effect of Soft Handoff on Packet Transmissions in Cellular CDMA Downkinks," IEEE ISPAN '04, pp. 42-47, May 2004.
Non-patent document 2: M. Kazmi, et. al., "Scheduling Algorithms for Soft Handoff in Cellular Packet CDMA," IEEE PIMRC 2000, pp. 671-675, September 2000.
Non-patent document 3: 3GPP TR 25.848 V4.0.0(2001-03)
Non-patent document 4: A. Jalali, R. Padovani, R. Pankaj, "Data Throughput of CDMA-HDR a High Efficiency-High Data Rate Personal Communication Wireless System," IEEE VTC 2000, pp. 1854-1858, 2000

SUMMARY OF INVENTION

Problem to be Solved by the Invention

However, there are disadvantages in the aforementioned related art.

In the method in which the upper station carries out scheduling taking account of the traffic class, there is a problem of control delay since the base station and the upper station are connected by a cable transmission channel. For example, information indicating that handover is to take place is transmitted to the upper station from the mobile station via the base station. The upper station takes the information into account and carries out scheduling. The base stations are notified of the resultant scheduling and transmit data to the mobile station. This is why control delay takes place between the upper station and the base station. In packet communications, since fast packet scheduling, which is carried out based on an instantaneous reception quality in the base station, is effective, permissible control delay has to be prescribed in range from several milliseconds (ms) to 10 ms.

In addition, scheduling that can address instantaneous fading is not carried out in the method in which the upper station carries out scheduling taking account of the traffic class.

Additionally, in the soft handover in W-CDMA, the despreading performed in the mobile station makes it possible to suppress signals from other stations. However, when the despreading is performed, a small portion of the signals from the other stations may remain as interference, so that there is caused a problem in that a macro diversity effect by soft handover is impaired. Especially, in shared channel communications in which one user occupies all the band width in a certain time period, inference from the other stations may increase, thereby largely impairing the micro diversity effect by the soft handover.

The present invention is directed to provide a control apparatus, a mobile station, a mobile communications system, and a control method that are capable of improving reception quality and shortening a control delay of the scheduling at the time of soft handover.

Means for Solving the Problem

In order to overcome the above disadvantages, a first aspect of the present invention provides a control apparatus that controls packet communications performed with a mobile station in plural sectors into which a covered area is divided. This control apparatus comprises a transmission allocation portion that selects at least two transmission sectors to perform transmission to the mobile station based on reception quality imparted from the mobile station; and a transmission portion that uses identical scramble codes for sector identification to transmit to the mobile station, the scramble codes being transmitted from the selected transmission sectors.

With such a configuration, handover control can be performed between sectors in one base station, and between one sector in one base station and another sector in another base station.

A second aspect of the present invention provides a mobile station that performs packet communications with a base station. The mobile station comprises a reception quality measurement portion that measures reception quality in each sector covered by the base station; a sector selection portion that selects a transmission sector in accordance with the reception qualities; a notification portion that notifies the base station of the measured reception quality; and a reception portion that uses identical scramble codes for sector identification to receive a received signal from the transmission sectors.

With such a configuration, the base station can be notified of the reception quality of each sector.

A third aspect of the present invention provides a mobile communications system that comprises a mobile station and a control apparatus that performs packet communications with the mobile station in the mobile communications system. The control apparatus includes a transmission allocation portion that selects at least two transmission sectors to perform transmission to the mobile station based on reception quality imparted from the mobile station; and a transmission portion that uses identical scramble codes for sector identification to transmit to the mobile station, the scramble codes being transmitted from the selected transmission sectors. The mobile station includes a reception quality measurement portion that measures reception quality in each sector covered by the base station; a sector selection portion that selects a transmission sector in accordance with the reception qualities; a notification portion that notifies the base station of the measured reception quality; and a reception portion that uses identical scramble codes for sector identification to receive a received signal from the transmission sectors.

With such a configuration, packet scheduling or sector selection can be performed in accordance with the reception quality.

A fourth aspect of the present invention provides a control method in a mobile communications system including a mobile station and a base station performing packet communications with the mobile station. In this method, the mobile station includes a reception quality measurement step of measuring reception quality in each sector covered by the base station; a sector selection step of selecting a transmission sector in accordance with the reception quality; and a notification step of notifying the base station of the measured reception quality; and the base station includes a transmission allocation step of selecting at least two transmission sectors that transmit to the mobile station in accordance with the reception quality imparted by the mobile station so as to perform transmission allocation to the mobile station; and a transmission step of transmitting to the mobile station from the transmission sectors using identical scramble codes for sector identification.

According to the above method, packet scheduling or sector selection can be performed in accordance with the reception quality.

Advantage of the Invention

According to embodiments of the present invention, there are provided a control apparatus, a mobile station, a mobile communications system, and a control method that are capable of improving reception quality and shortening a control delay of the scheduling at the time of soft handover.

BRIEF DESCRIPTION OF THE DRAWINGS

FIG. 5 is an explanatory view of soft handover;

FIG. 6A is an explanatory view of scramble code notification;

LIST OF REFERENCE SYMBOLS

100: base station
200, 2001, 2002, 2003, 2004, 2005: mobile station

BEST MODE FOR CARRYING OUT THE INVENTION

Referring to the accompanying drawings, preferred embodiments of the present invention will be described hereinafter.

In all the drawings for illustrating the embodiments, like reference marks are given to members or components having like functions, and repetition of the description is omitted.

Figure 1:
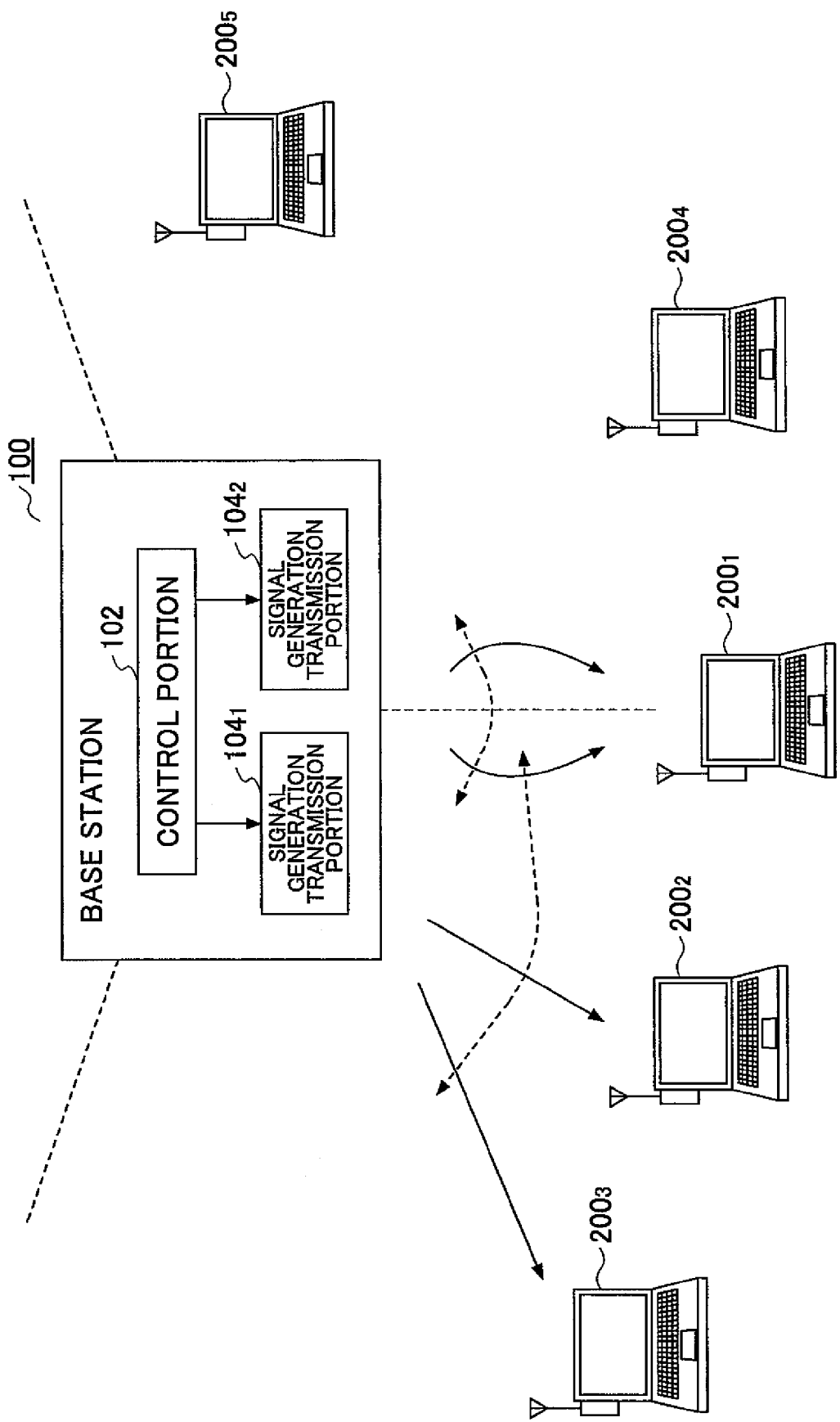
FIG. 1 is a schematic view illustrating a mobile communications system according to an embodiment of the present invention.

First, referring to FIG. 1, a mobile communications system according to an embodiment of the present invention is described.

The mobile communications system according to the embodiment includes a base station 100 and a mobile station 200 that can carry out radio communications with the base station 100. For example, the mobile station 200 may be terminal devices that have a communications function, for example, terminal devices $200_1$, $200_2$, $200_3$, $200_4$, $200_5$. As an example, the mobile station 200 is employed in the following description.

In the mobile communications system according to this embodiment, fast packet scheduling is carried out when handover is carried out between plural sectors in the same base station 100.

The base station 100 includes a control portion 102, and signal generation and transmission portions $104_1$, $104_2$ connected to the control portion 102, and divides the cell into plural sectors. The user, for example, the terminal device $200_1$, that exists at or around the boundary between the sectors carries out at least one of soft handover and fast sector selection between the two sectors.

The control portion 102 selects fast sector selection and determines an optimal sector. In addition, when the soft handover is carried out for users that straddle the boundary between plural sectors in downlink, the control portion 102 performs the fast packet scheduling so as to select users.

The signal generation and transmission portions $104_1$, $104_2$ generate signals and transmit the signals under control of the control portion 102. In this case, when the control portion 102 determines that transmission is to be carried out from both sectors, the signal generation and transmission portions $104_1$, $104_2$ transmit the signals.

The fast sector selection is a control method in which reception quality is measured in two sectors and an optimal sector is selected based on the measured reception quality. For example, the sector whose reception quality is better is selected and communications are carried out by this sector. In addition, the fast packet scheduling is a control method in which corresponding reception qualities of plural users are measured in a certain sector and an optimal user is selected based on the measured reception qualities. For example, communications are carried out with the user having the best reception quality for a particular moment.

As stated, the fast sector selection and the fast packet scheduling are the control methods based on the reception quality. In the mobile communications system according to this embodiment, the two methods are combined. For example, there are combinations where the packet scheduling is first carried out and then the fast sector selection is carried out; the packet scheduling is first carried out and then the soft handover is carried out; and the fast sector selection is first carried out and then the packet scheduling is carried out. These combinations are described in the following.

A mobile communications system according to a first example of the present invention is described.

The mobile communications system according to this example carries out the fast packet scheduling first and then the fast sector selection. In this case, the handover users are subjected to the scheduling in all the sectors. In addition, transmission is carried out from the sector in which transmission allocation is carried out. Moreover, when transmission allocations are carried out simultaneously in plural sectors, an optimal sector is selected so as to carry out transmission.

In this example, the base station 100 divides the cell into three sectors, for example, a sector 1, a sector 2, and a sector 3 and controls the sectors. However, the base station 100 may divide the cell into a different number of sectors.

Figure 2:
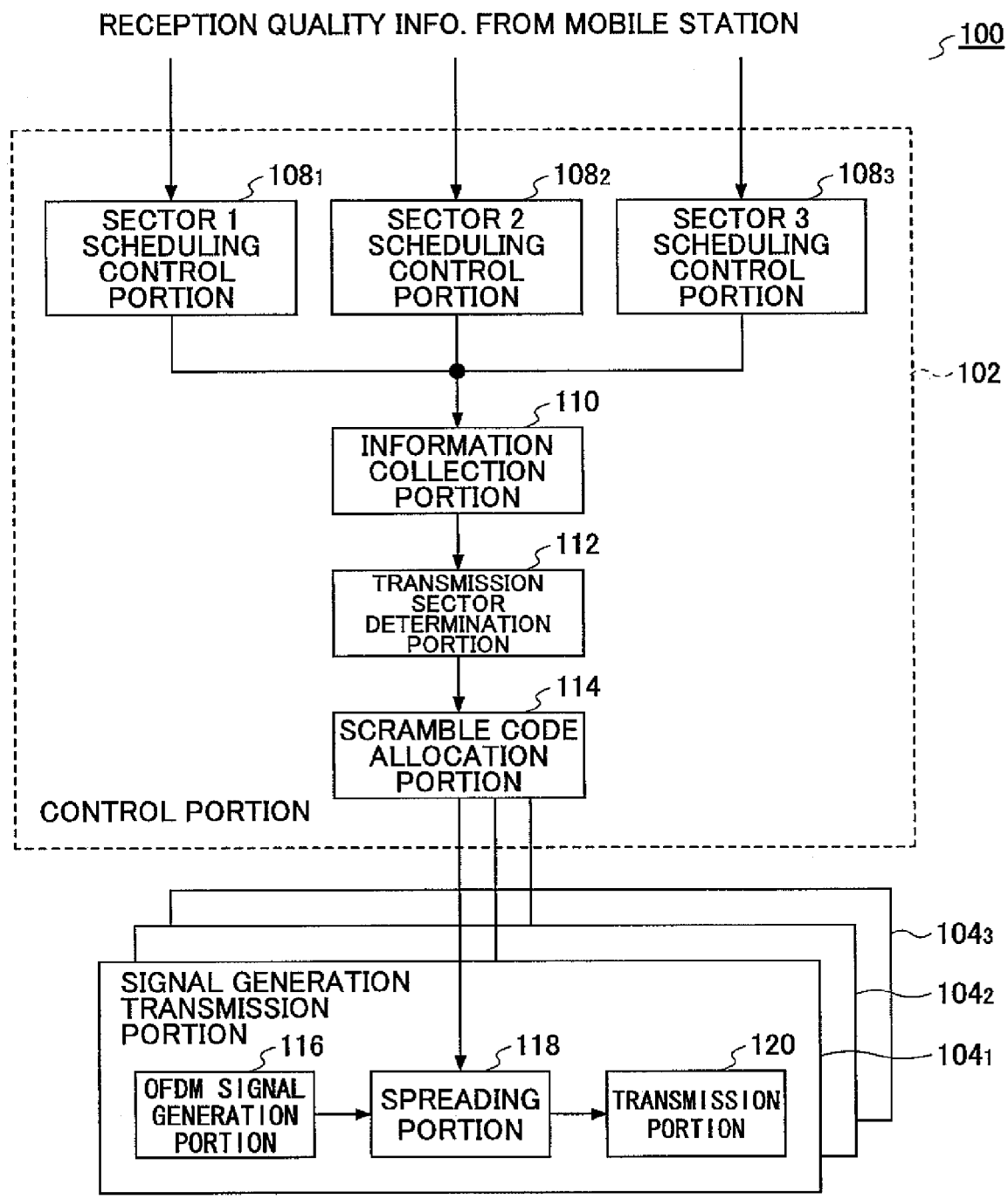
FIG. 2 is a partial block diagram illustrating a base station according to one example of the present invention.

As shown in FIG. 2, the base station 100 as a control apparatus according to this example includes a sector 1 scheduling control portion $108_1$; a sector 2 scheduling control portion $108_2$; a sector 3 scheduling control portion $108_3$; an information collection portion 110 connected to the sector 1 scheduling control portion $108_1$, the sector 2 scheduling control portion $108_2$, and the sector 3 scheduling control portion $108_3$; a transmission sector determination portion 112 as transmission allocation means connected to the information collection portion 110; a scramble code allocation portion 114 connected to the transmission sector determination portion 112; and the signal generation and transmission portions $104_1$, $104_2$, $104_3$ as transmission means connected to the scramble code allocation portion 114.

The signal generation and transmission portions $104_1$, $104_2$, $104_3$; are configured in the same manner so as to include a spreading portion 118 connected to the scramble code allocation portion 114, an OFDM signal generation portion 116 connected to the spreading portion 118, and a transmission portion 120.

The sector 1 scheduling control portion $108_1$, the sector 2 scheduling control portion $108_2$, and the sector 3 scheduling control portion $108_3$, the information collection portion 110, the transmission sector determination portion 112; and the scramble code allocation portion 114 constitute the control portion 102. In addition, the sector 1 scheduling control portion $108_1$, the sector 2 scheduling control portion $108_2$, and the sector 3 scheduling control portion $108_3$ have a scheduling function.

In each sector, the sector 1 scheduling control portion $108_1$, the sector 2 scheduling control portion $108_2$, and the sector 3 scheduling control portion $108_3$ determine, based on various kinds of algorithms including, for example, a round robin, a maximum CIR (see non-patent document 3, for example) and a proportional fairness (see non-patent document 4, for example) a user to which the transmission should be allocated and outputs the information about the user to the information collection portion 110.

The information collection portion 110 collects the received information indicating the user to which the transmission is allocated and outputs the information to the transmission sector determination portion 112.

The transmission sector determination portion 112 determines a sector through which the transmission is carried out for the handover user and outputs the result to the scramble code allocation portion 114. In this case, when the transmission sector determination portion 112 determines that only one sector should be allocated as the sector for the transmission, the information indicating this sector is input to the scramble code allocation portion 114.

In addition, the transmission sector determination portion 112 determines that plural sectors should be allocated as the sector for the transmission, the transmission sector determination portion 112 selects an optimal sector among the plural sectors and outputs the information indicating the selected sector to the scramble code allocation portion 114.

The scramble code allocation 114 outputs a scramble code to the spreading portion 118 of the signal generation and transmission portion 104 corresponding to the sector whose information has been received.

On the other hand, the OFDM signal generation portion 116 generates an OFDM signal based on the data to be transmitted and outputs the signal to the spreading portion 118.

The spreading portion 118 spreads the received OFDM signal using the received scramble code and outputs the spread signal to the transmission portion 120.

The transmission portion 120 performs IFFT processing on the spread OFDM signal and transmits the processed signal.

Figure 3:
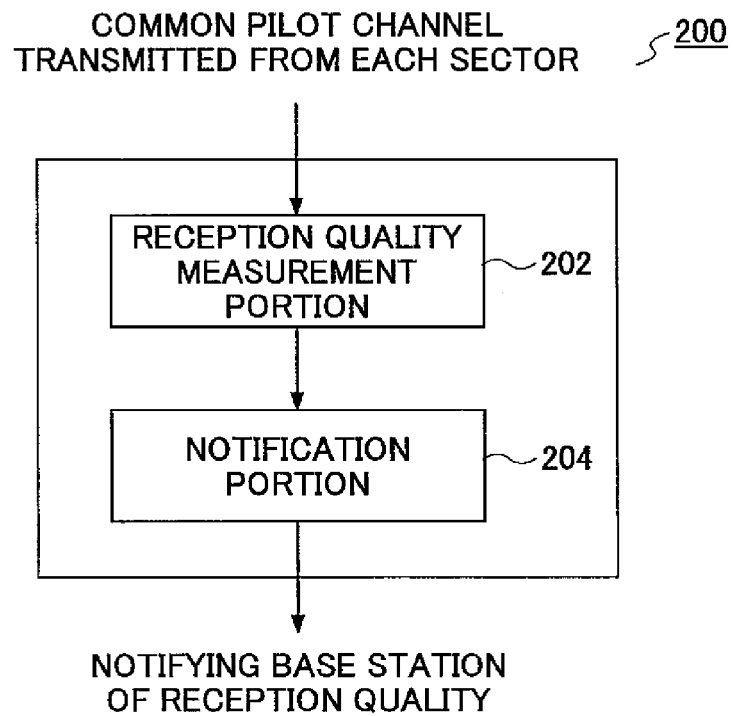
FIG. 3 is a partial block diagram illustrating a mobile station according to one example of the present invention.

Next, the mobile station 200 is described referring to FIG. 3.

The mobile station 200 includes a reception quality measurement portion 202 to which a common pilot channel (reference signal) transmitted from each sector is input, and a notification portion 204 connected to the reception quality measurement portion 202.

The reception measurement portion 202 measures reception quality, for example, a reception power level, a received SINR (signal-to-interference plus noise power ratio) or the like, using, for example, the common pilot channel transmitted from each sector, and outputs the measurement result to the notification portion 204.

The notification portion 204 notifies the base station 100 of the received information, which indicates the reception quality, of the base station 100.

Figure 4A:
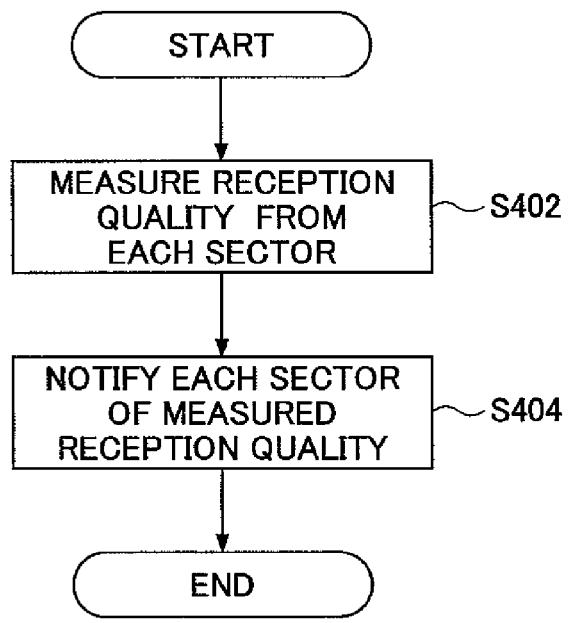
FIG. 4A is a flowchart illustrating operations of a mobile station according to one example of the present invention.
Figure 4B:
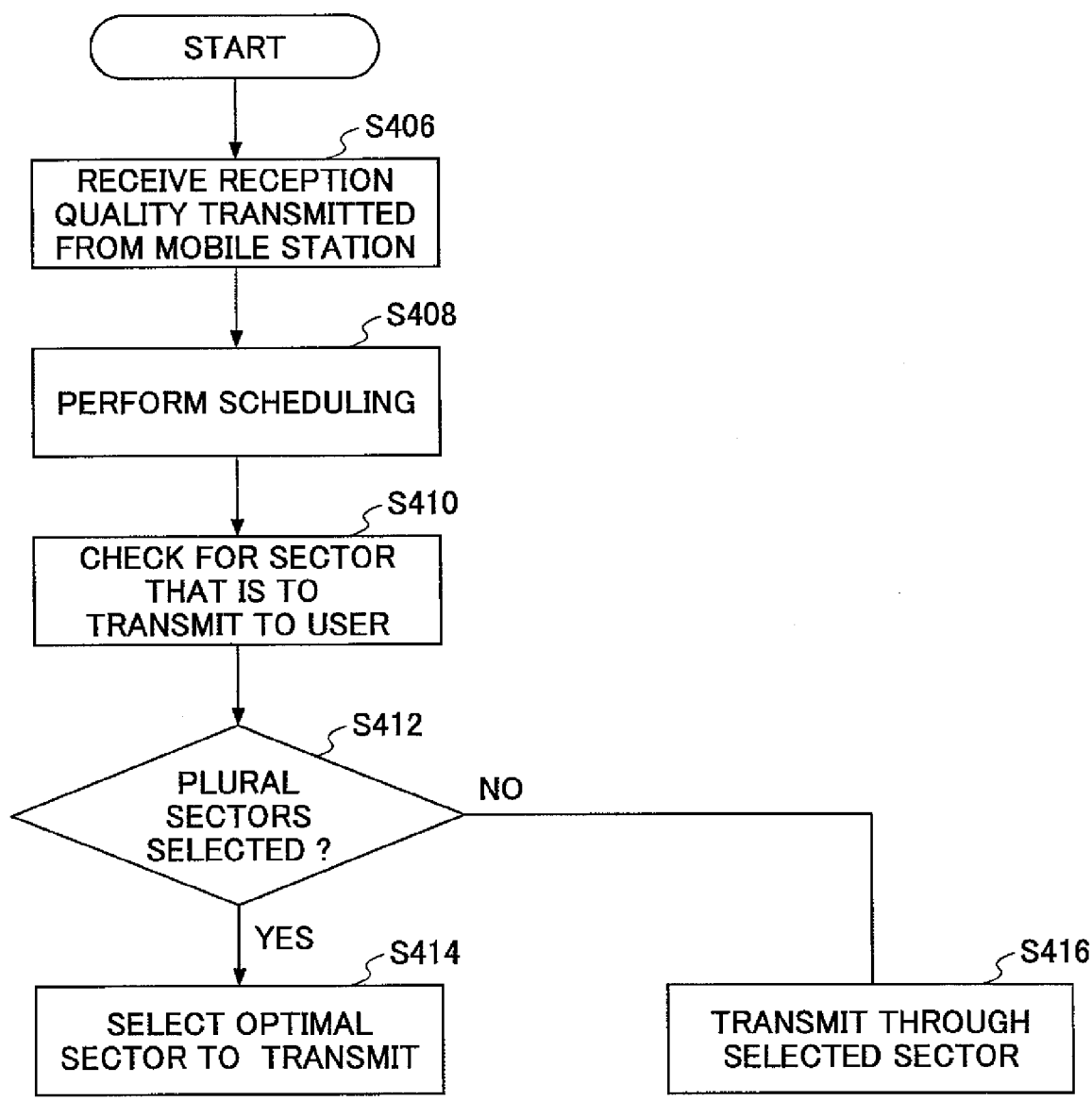
FIG. 4B is a flowchart illustrating operations of a base station according to one example of the present invention.

Next, there is described how the mobile communications system according to this example operates, referring to FIGS. 4A and 4B, where the mobile station 200 exists at and around the boundary between the sector 1 and the sector 2.

First, the operation of the mobile station 200 is described referring to FIG. 4A.

The reception quality measurement portion 200 measures the reception qualities based on the common pilot channels from individual sectors (step S402).

Then, the notification portion 204 transmits the information on the measured reception qualities to each sector of the base station 100 (step S404).

Next, the operation of the base station 100 is described referring to FIG. 4B.

The information indicating the reception quality, which is transmitted from the mobile station 200, is received by the base station 100 and then output to the sector 1 scheduling control portion $108_1$ and the sector 2 scheduling control portion $108_2$ (step S406).

Next, the sector 1 scheduling control portion $108_1$ and the sector 2 scheduling control portion $108_2$ perform scheduling independently, based on the received reception quality (step S408).

Then, the transmission sector determination portion 112 selects a sector to be used for transmission to the handover user (step S410), and determines whether plural sectors are selected (step S412).

When plural sectors are selected (step S412: YES), the transmission sector determination portion 112 selects the optimal sector based on, for example, the reception quality, and outputs the information indicating the selected sector to the scramble code allocation portion 114. The scramble code allocation portion 114 selects a scramble code out of scramble codes allocated for the selected sector, and outputs the scramble code to the spreading portion 118 of the signal generation and transmission portion 104. The signal generation and transmission portion 104 performs spreading using the scramble code input from the scramble code allocation portion 114 and then performs transmission (step S414).

On the other hand, when plural sectors are not selected, or only one sector is selected (step S412: NO), the transmission sector determination portion 112 outputs the information indicating the selected sector to the scramble code allocation portion 114.

The scramble code allocation portion 114 selects a scramble code out of scramble codes allocated for the selected sector and outputs the selected scramble code to the spreading portion 118 of the signal generation and transmission portion 104. The signal generation and transmission portion 104 performs spreading using the scramble code input from the scramble code allocation portion 114 and then performs transmission (step S416).

According to the mobile communications system according to this example, the reception quality is measured in the two sectors and scheduling is performed in each sector, thereby enabling selection of an optimal user using information on each sector.

In addition, since the handover control is carried out in the base station, the control delay in scheduling can be reduced, thereby improving the throughput and increasing an allocation probability for the handover users. Moreover, when two sectors are selected, the sector with better reception quality, for example, can be selected, which enables the handover users (mobile stations) to eliminate redundant consumption of resources.

Although the OFDM method is employed in this example, the sector 1 scheduling control portion $108_1$, the sector 2 scheduling control portion $108_2$, and the sector 3 scheduling control portion $108_3$ and the transmission sector determination portion 112 can be applied to other communications methods and demonstrate the same effects.

Next, a mobile communications system according to a second example of the present invention is described.

The mobile communications system according to this example carries out the packet scheduling and then the soft handover. In this case, the handover users are subjected to the scheduling in all the sectors. In addition, the sector allocated for transmission performs transmission. Moreover, when plural sectors are simultaneously allocated for transmission, the plural sectors perform transmission. Furthermore, when transmission allocation is carried out only in one sector, no transmission is carried out.

Also in this example, the base station 100 can divide the cell into, for example, a sector 1, a sector 2, and a sector 3 and control these sectors. However, the base station 100 may divide the cell into a different number of sectors.

The base station 100 as a control apparatus according to this example has substantially the same configuration as the base station described for the first example, detailed explanation of which is omitted. However, the base station 100 according to this example is different from the base station of the first example, in terms of functions of the transmission sector determination portion 112 and the scramble code allocation portion 114.

The transmission sector determination portion 112 determines a sector through which the transmission is carried out to the handover user and outputs the result to the scramble code allocation portion 114. In this case, when the transmission sector determination portion 112 determines that only one sector should be allocated as the sector that carries out transmission, the transmission sector determination portion 112 does not output the information indicating this sector to the scramble code allocation portion 114 in order that no transmission is performed. On the other hand, the transmission sector determination portion 112, when having determined that plural sectors are selected, outputs the information indicating the selected sectors to the scramble code allocation portion 114.

Referring to FIG. 5, there is described a situation where the mobile station 200 exists at a bounder region between the sector 1 and the sector 2, for example.

As the mobile station 200 comes close to an area covered by the sector 2 from an area covered by the sector 1, the reception quality from the sector 2 becomes improved, while the reception quality from the sector 1 is impaired. Namely, each reception quality from the sector 1 and the sector 2 is inverted at the boundary region between the area covered by the sector 1 and the area covered by the sector 2.

When it is determined that the mobile station 200 exists in the vicinity of a location in which the reception quality from the sector 1 is the same as the reception quality from the sector 2, the transmission sector determination portion 112 determines that the sector 1 and the sector 2 perform transmission. For example, while the mobile station 200 moves from the sector 1 to the sector 2, when a difference between the reception quality from the sector 1 and the reception quality from the sector 2 is lower than a predetermined threshold, which may be, for example, a soft handover add threshold, a soft handover drop threshold or the like, it is determined that the sector 1 and the sector 2 are selected as the transmitting sectors in this handover.

For example, the soft handover add threshold indicates a value obtained by subtracting the reception quality of the sector 2 of the reception quality from the sector 1; and the soft handover drop threshold indicates a value obtained by subtracting the reception quality of the sector 1 from the reception quality of the sector 2. These two thresholds may be identical or different.

The scramble code allocation portion 114 outputs the information indicating a scramble code to the spreading portion 118 of the signal generation and transmission portion 104 corresponding to the plural sectors indicated in the received information. In this case, the scramble code allocation portion 114 outputs the information indicating the scramble code used to the spreading potion 118 of the signal generation and transmission portion 104$_1$ corresponding to the sector through which transmission has been performed (referred to as a handover original sector), for example, the sector 1. In addition, the scramble code allocation portion 114 outputs the information indicating a scramble code that is the same as the scramble code used in the handover original sector to the spreading portion 118 of the signal generation and transmission portion 104$_2$ corresponding to the sector through which transmission is to be performed (referred to as a handover destination sector), for example, the sector 2.

For example, as shown in FIG. 6A, each sector can have information on the scramble codes that are used in other sectors in advance. In this case, the information collection portion 110 collects information on the scramble codes used in the sectors, in addition to the information indicating the user allocated for transmission by the sector 1 scheduling control portion 108$_1$, the sector 2 scheduling control portion 108$_2$, or the sector 3 scheduling control portion 108$_3$.

The transmission sector determination portion 112 outputs the information on the scramble codes used, in addition to the information on the sector that performs transmission, to the scramble code allocation portion 114.

The scramble code allocation portion 114 outputs the information indicating the scramble code that is the same as the scramble code used in the handover original sector, which is the sector performing transmission, to the spreading portion 118 of the handover destination sector, to which the user is handed over. Namely, when the soft handover is carried out, or when the user exists at an area in which the soft handover is carried out, the same scramble code currently used in the handover original sector is tentatively used in the handover destination sector.

When the soft handover is completed, the scramble code allocation portion 114 outputs the information indicating the scramble code that can be used in the handover destination sector to the spreading portion 118.

In addition, each sector does not always have the scramble codes used in other sectors. Instead, the mobile station 200 notifies the base station 100 of the information indicating the scramble code used, in addition to the information indicating the reception quality.

Figure 6B:
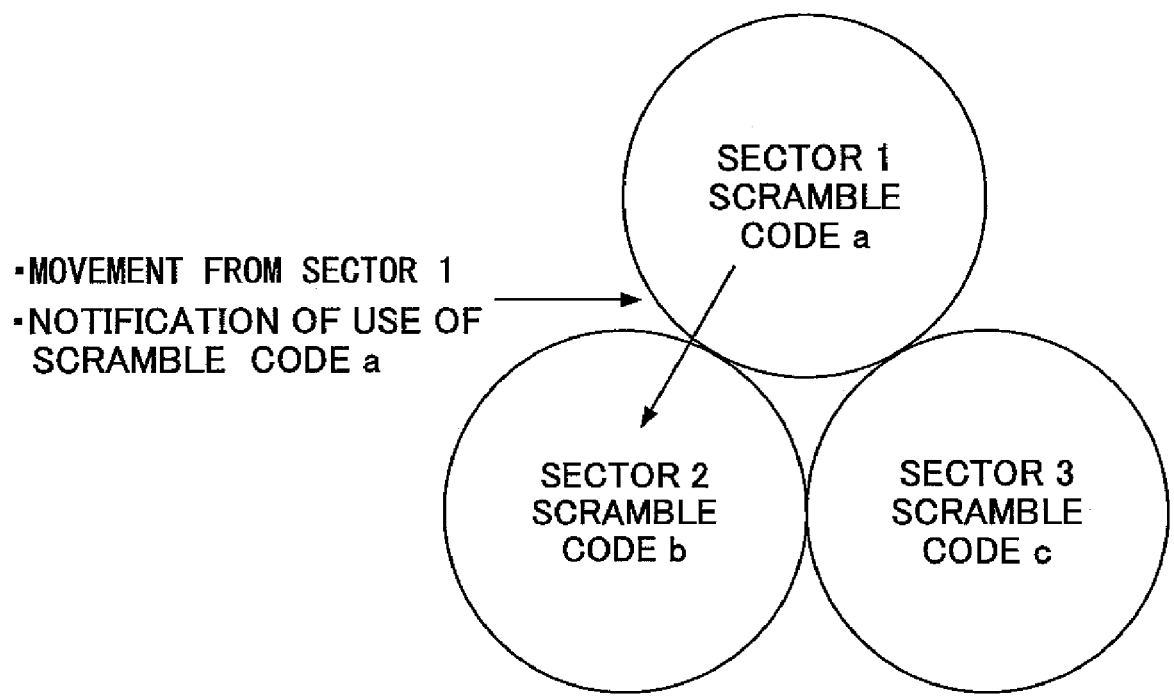
FIG. 6B is an explanatory view of scramble code notification.

For example, as shown in FIG. 6B, the mobile station 200 transmits the information on the scramble code being used, in addition to the information indicating the reception quality, to the scheduling control portion 108 of each sector. Then, the same control as described with reference to FIG. 6A is carried out.

Figure 7:
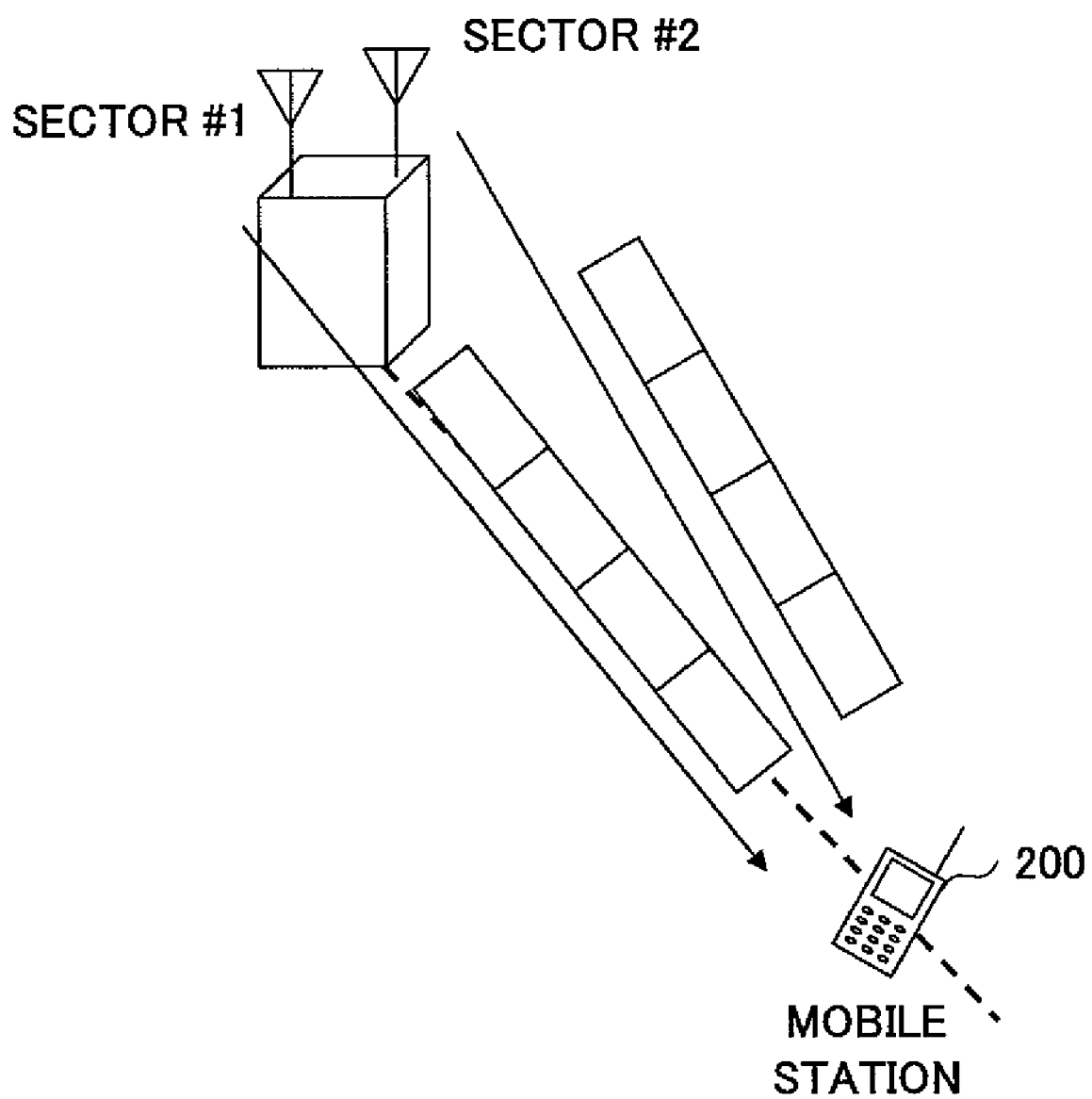
FIG. 7 is an explanatory view of received signal synthesis.

In the OFDM radio access, as shown in FIG. 7, each sector, for example, the sectors #1 and #2 transmit the same data and the soft-combining is carried out in the mobile station 200.

Figure 8:
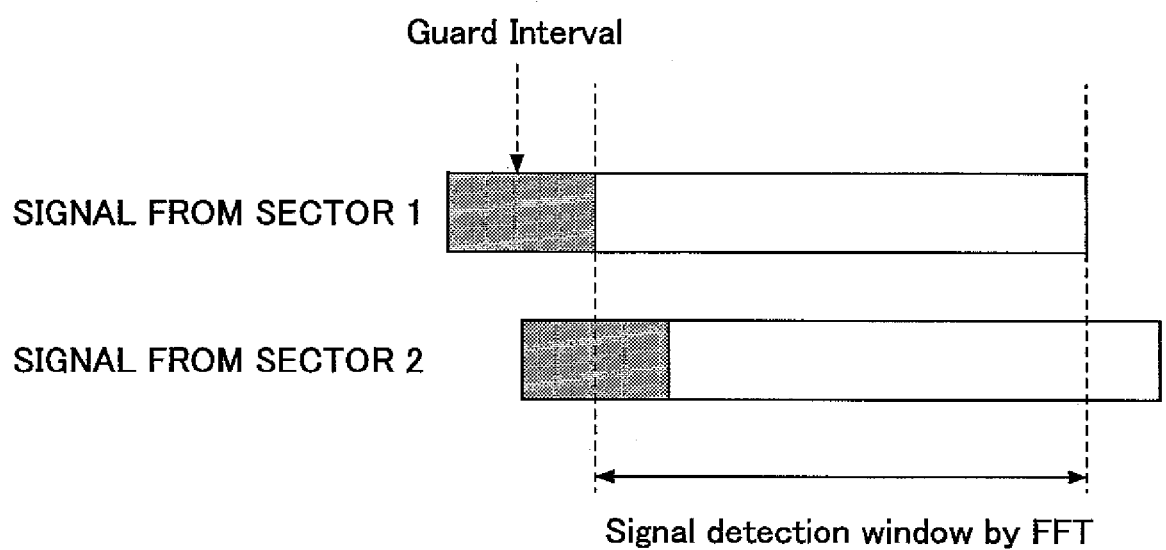
FIG. 8 is an explanatory view of received signal synthesis.

In this case, as shown in FIG. 8, when all the reception timing differences in all the sectors are within a guard interval, since no interference is caused by other sectors, synthesis of desired signals can be performed in the mobile station 200 even if the same scramble codes are used in the plural sectors. Therefore, the reception quality in the mobile station 200 can be improved.

Next, there is described how the mobile communications system according to this embodiment operates, taking as an example a situation where the mobile station 200 exists at and around the boundary between the sector 1 and the sector 2.

The mobile station 200 operates in the same manner as the mobile station described for the first example and thus the detailed description is omitted.

Figure 9:
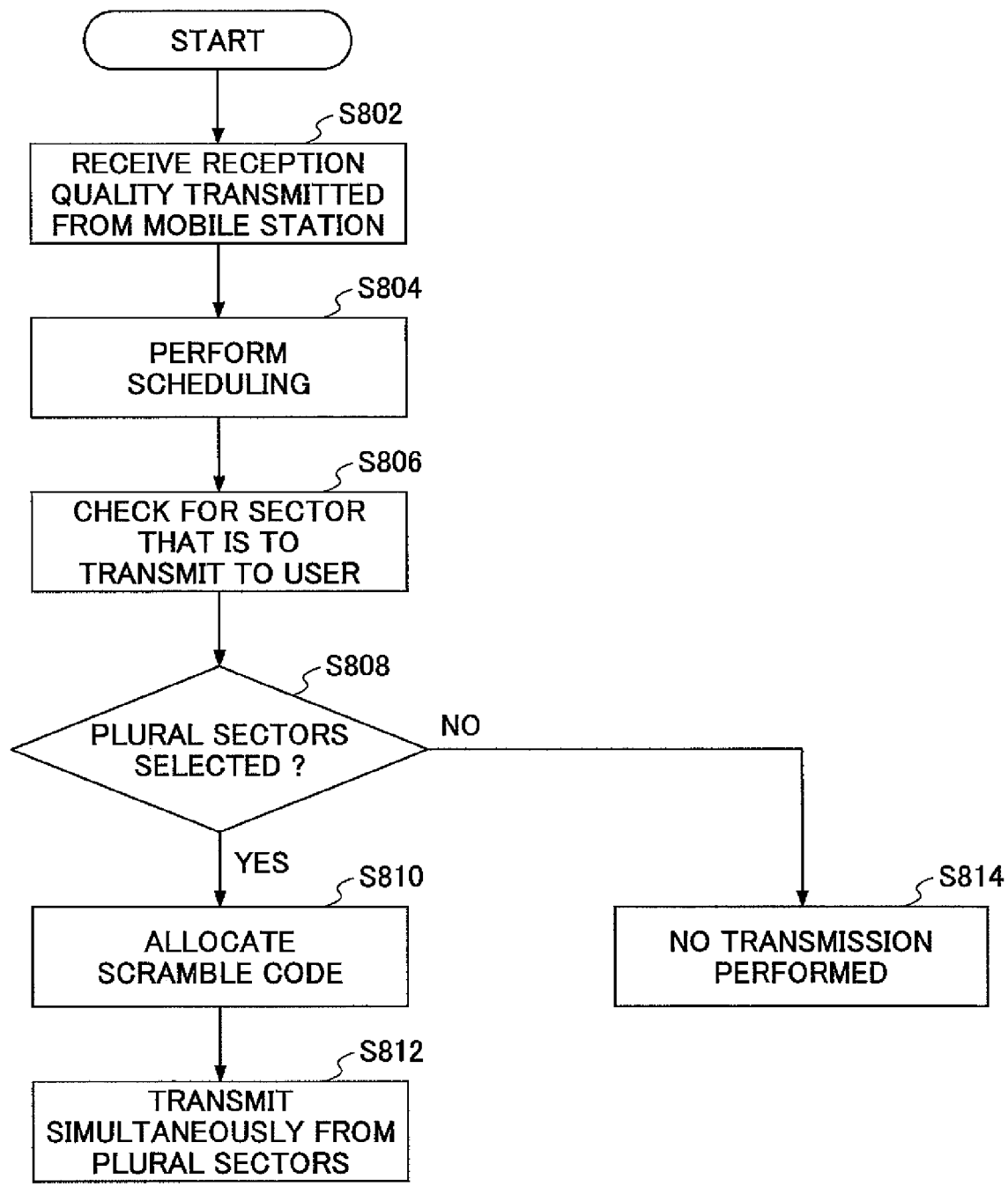
FIG. 9 is a flowchart illustrating operations of a base station according to one example of the present invention.

Referring to FIG. 9, the operation of the base station 100 is described.

The information indicating reception quality transmitted from the mobile station 200 is received by the base station 100 and then input to the sector 1 scheduling control portion 108$_1$, the sector 2 scheduling control portion 108$_2$ (step S802). Here, the reception quality measurement portion 202 of the mobile station 200 may measure the reception quality after synthesis, for example, a reception power, a received SINR or the like, and transmit the measurement result to the base station 200. In this case, the information indicating the reception quality after the synthesis is received by the base station 100 and then input to the sector 1 scheduling control portion 108$_1$ and the sector 2 scheduling control portion 108$_2$.

Next, the sector 1 scheduling control portion 108$_1$ and the sector 2 scheduling control portion 108$_2$ perform the scheduling based on the input reception quality (step S804).

Then, the information collection portion 110 collects information on the scramble code used in each sector and the information relating to the selected user. The transmission sector determination portion 112 determines the sector that is to transmit to the handover user (step S806) and determines whether plural sectors are selected (step S808).

When plural sectors are selected (step S808: YES), the transmission determination portion 112 outputs the information indicating the selected sectors to the scramble code allocation portion 114. In this case, the scramble code allocation portion 114 outputs to the spreading portion 118 of, for example, the signal generation and transmission portion 104$_1$ corresponding to the handover original sector, i.e., the sector 1, the information indicating the scramble code used. In addition, the scramble code allocation portion 114 outputs to the spreading portion 118 of, for example, the signal generation and transmission portion 104$_2$ corresponding to the handover destination sector, i.e., the sector 2, the information indicating the same scramble code as the scramble code used in the handover original sector (step S810).

The signal generation and transmission portion 104$_1$ and the signal generation and transmission portion 104$_2$ perform spreading using the scramble codes input from the corresponding scramble code allocation portions 114. Then, transmissions are carried out from the two sectors (step S812). The mobile station 200 receives the received signals from the transmission sectors using the same scramble code for recognizing the sectors at the reception portion (not shown) of the mobile station 200.

On the other hand, when plural sectors are not selected, namely, when no sectors are selected or only one sector is selected (step S808: NO), the transmission sector determination portion 112 does not output the information indicating the sector to the scramble code allocation portion 114, which means no transmission is performed (step S814). When one sector is selected, quality is not ensured in some cases even if the transmission is performed by the sector. This is why no transmission is carried out.

According to the mobile communications system of this example, an optimal transmission user can be selected using the information on each sector.

In addition, since the handover is controlled by the base station, a control delay in scheduling can be reduced, thereby improving throughput.

Although the OFDM method is employed in this example, the sector 1 scheduling control portion $108_1$, the sector 2 scheduling control portion $108_2$, and the sector 3 scheduling control portion $108_3$ and the transmission sector determination portion 112 can be applied to other communications methods and demonstrate the same effects.

Next, a mobile communications system according to a third example of the present invention is described.

The mobile communications system according to this example carries out the packet scheduling and then the soft handover. In this case, the handover users are subjected to the scheduling in all the sectors. In addition, the sector allocated for transmission performs transmission. Moreover, when at least one sector is allocated for transmission, all the sectors perform transmission.

Also in this example, the base station 100 divides the cell into three sectors, for example, a sector 1, a sector 2, and a sector 3 and controls these sectors. However, the base station 100 may divide the cell into a different number of sectors.

The base station 100 as a control apparatus according to this example has substantially the same configuration as the base station described for the second example, detailed explanation of which is omitted. However, the base station 100 according to this example is different from the base station of the first example, in terms of a function of the transmission sector determination portion 112.

The transmission sector determination portion 112 determines a sector that performs transmission to the handover user and outputs the result to the scramble code allocation portion 114. In this case, the transmission sector determination portion 112, when having determined that at least one sector is allocated as the sector that performs transmission, outputs to the scramble code allocation portion 114 the information indicating all the sectors.

The scramble code allocation portion 114 outputs the information indicating the scramble code to the spreading portion 118 of the signal generation and transmission portion 104 corresponding to the sector imparted from the transmission sector determination portion 112. In this case, the scramble code allocation portion 114 outputs to the spreading portion 118 of the signal generation and the transmission portion $104_1$ of the handover original sector, for example, the sector 1 the information indicating the scramble code being used.

In addition, the scramble code allocation portion 114 outputs the information indicating the same scramble code as the scramble code being used in the handover original sector to the spreading portions 118 of the signal generation and transmission portions $104_2$ of the handover destination sectors except for the handover original sector.

When the soft handover is completed, the scramble code allocation portion 114 outputs to the spreading portions 114 the information indicating the scramble code that is allocated for the handover destination sectors.

Next, there is described how the mobile communications system according to this example operates, where the mobile station 200 exists at and around the boundary between the sector 1 and the sector 2.

The mobile station 200 operates in the same manner as the mobile station described for the first example and thus the description is omitted.

Figure 10:
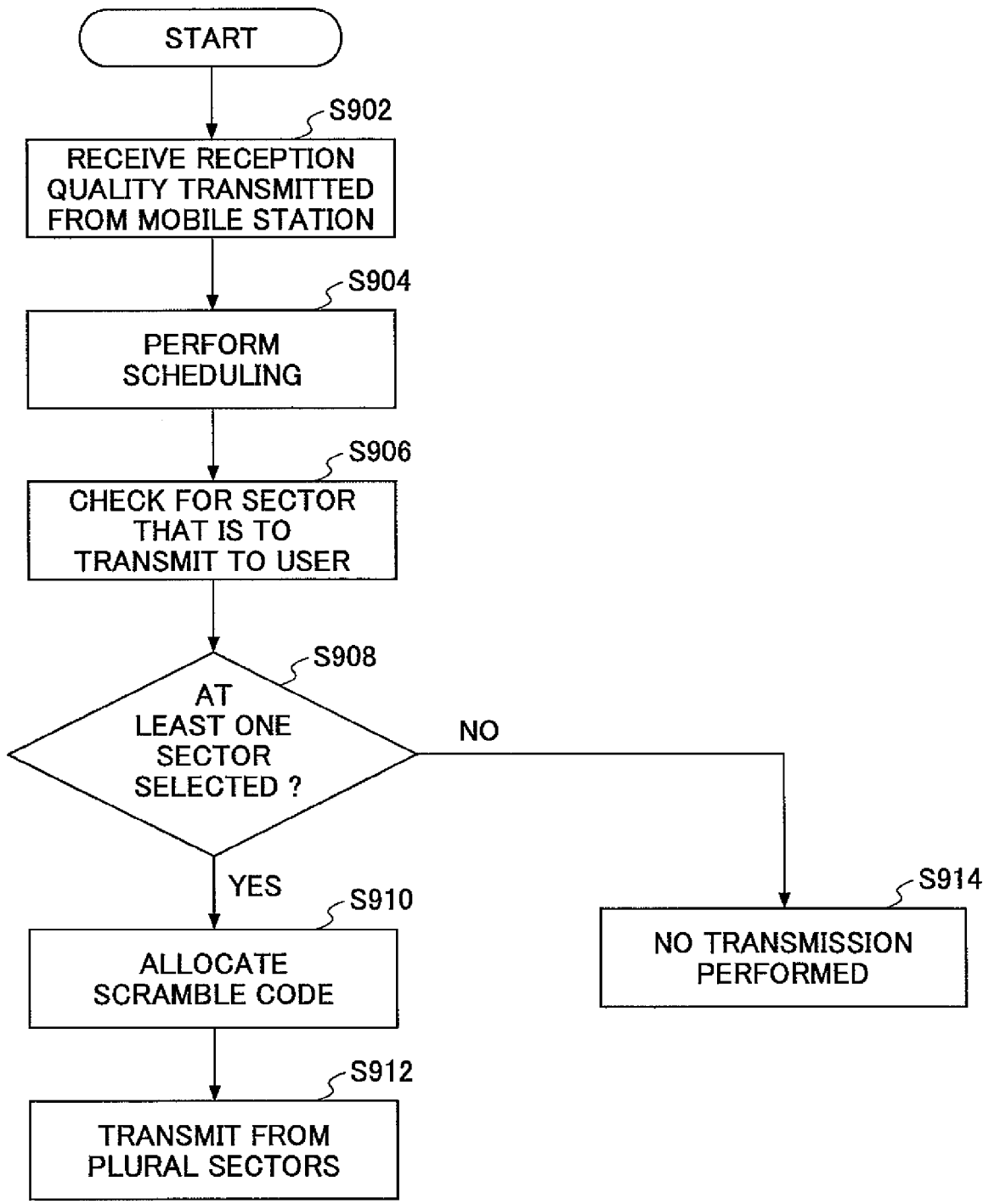
FIG. 10 is another flowchart illustrating operations of a base station according to one example of the present invention.

The operation of the base station 100 is described referring to FIG. 10.

The information indicating the reception quality transmitted from the mobile station 200, for example, reception power or received SINR is received by the base station 100 and then imparted to the sector 1 scheduling control portion $108_1$ and the sector 2 scheduling control portion $108_2$ (step S902).

Next, the sector 1 scheduling control portion $108_1$ and the sector 2 scheduling control portion $108_2$ perform scheduling based on the imparted reception quality (step S904).

Then, the information collection portion 110 collects information regarding the selected user and information on the scramble code being used in each sector. The transmission sector determination portion 112 selects a sector that is to transmit to the handover user (step S906) and determines whether at least one sector is selected (step S908).

When at least one sector is selected (step S908: YES), the transmission sector determination portion 112 outputs the information indicating all the sectors, for example, the sectors 1, 2, to the scramble code allocation portion 114. The scramble code allocation portion 114 outputs the information indicating the scramble code being used to the spreading portion 118 of, for example, the signal generation and transmission portion $104_1$ of the handover original sector, i.e., the sector 1.

In addition, the scramble code allocation portion 114 outputs the information indicating the same scramble code as the scramble code being used in the handover original sector to the spreading portion 118 of, for example, the signal generation and transmission portion $104_2$ corresponding the handover destination sector, i.e., the sector 2 (step S910).

The signal generation and transmission portion $104_1$, and the signal generation and transmission portion $104_2$ perform spreading using the scramble codes input from the corresponding scramble code allocation portions 114. Then, transmissions are carried out from the two sectors (step S912). The mobile station 200 receives the received signals from the transmission sectors using the identical scramble codes for recognizing the sectors at the reception portion (not shown) of the mobile station 200.

On the other hand, when at least one sector is not selected, namely when no sector is selected (step S908: NO), no transmission is carried out (step S914).

When the transmission is carried out only if the two sectors are simultaneously selected, there is a problem in that the number of times of allocations is reduced, while communications quality is ensured since the transmission is carried out at the time of good reception conditions. However, such a problem can be solved as stated above.

In this example, when at least one sector is selected for the handover user, all the sectors simultaneously perform transmission. Therefore, since the received signals from two or more sectors are synthesized in the mobile station, the reception quality can be improved even though reception quality is satisfied only in one sector.

According to the mobile communications system of this example, the optimal users can be selected using the information on each sector.

In addition, since the base station performs control of the handover, control delay in scheduling can be reduced, thereby improving the throughput. Moreover, allocation rate, namely, the number of times allocations made can be increased.

Although the OFDM method is employed in this example, the sector 1 scheduling control portion $108_1$, the sector 2 scheduling control portion $108_2$, the sector 3 scheduling control portion $108_3$ and the transmission sector determination portion 112 can operate in the aforementioned manner even under other communications methods and demonstrate the same effects.

Next, there is described a mobile communications system according to a fourth example of the present invention.

The mobile communications system according to this example carries out the packet scheduling and then the handover. In this case, the handover users are subjected to the scheduling in all the sectors. In addition, transmission is carried out from the sector in which transmission allocation is carried out.

In this example, the base station 100 divides the cell into three sectors, for example, a sector 1, a sector 2, and a sector 3 and controls these sectors. However, the base station 100 may divide the cell into a different number of sectors.

The base station 100 as a control apparatus according to this example has substantially the same configuration as the base station described for the second example, the detailed explanation of which is omitted. However, the base station 100 according to this example is different from the base station of the first example, in terms of a function of the transmission sector determination portion 112.

The transmission sector determination portion 112 determines a sector that is to transmit for the handover user and outputs the result to the scramble code allocation portion 114. In this case, the transmission sector determination portion 112, when having determined that only one sector is allocated as the sector for the transmission, outputs the information indicating the allocated sector to the scramble code allocation portion 114.

In addition, the transmission sector determination portion 112, when having determined that plural sectors should be allocated as the sector for the transmission, outputs the information indicating the sectors to the scramble code allocation portion 114.

The scramble code allocation portion 114 outputs the information indicating the scramble code to the spreading portion 118 of the signal generation and transmission portion 104 corresponding to the sector indicated by the received information. In this case, the scramble code allocation portion 114 outputs to the spreading portion 118 of, for example, the signal generation transmission portion $104_1$ corresponding to the handover original sector, i.e., the sector 1 the information indicating the scramble code being used.

In addition, the scramble code allocation portion 114 outputs to the spreading portion 118 of, for example, the signal generation and transmission portion $104_2$ corresponding to the handover destination sector, i.e., the sector 2 the information indicating the scramble code which is the same as the scramble code being used in the handover original sector.

When the soft handover is completed, the scramble code allocation portion 114 outputs the scramble code that can be used in the handover destination sector to the spreading portion 114.

Next, there is described how the mobile communications system according to this example operates, where the mobile station 200 exists at and around the boundary between the sector 1 and the sector 2.

The mobile station 200 operates in the same manner as the mobile station described for the first example and thus the detailed description is omitted.

Figure 11:
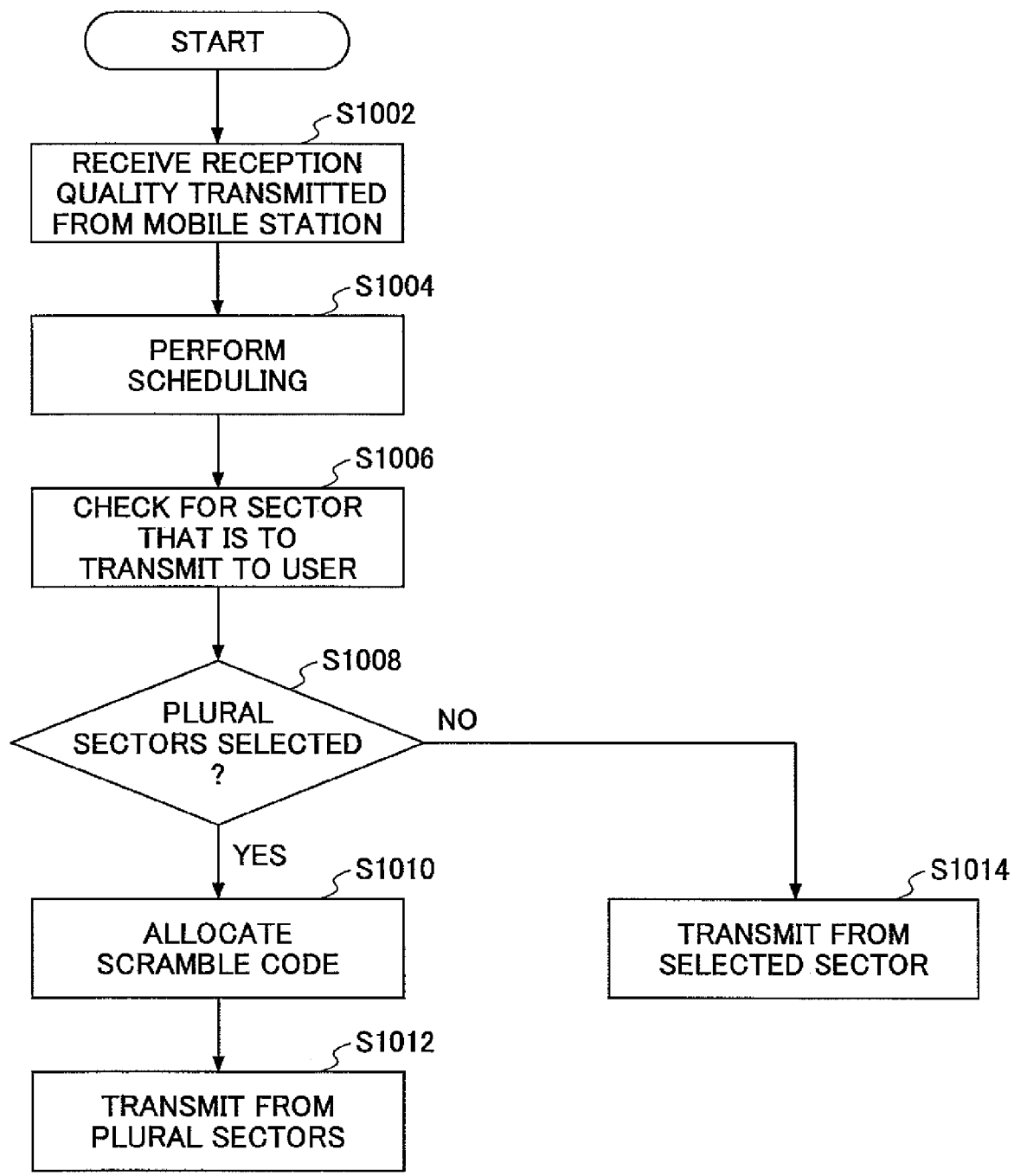
FIG. 11 is a flowchart illustrating operations of a base station according to one example of the present invention.
Figure 12:
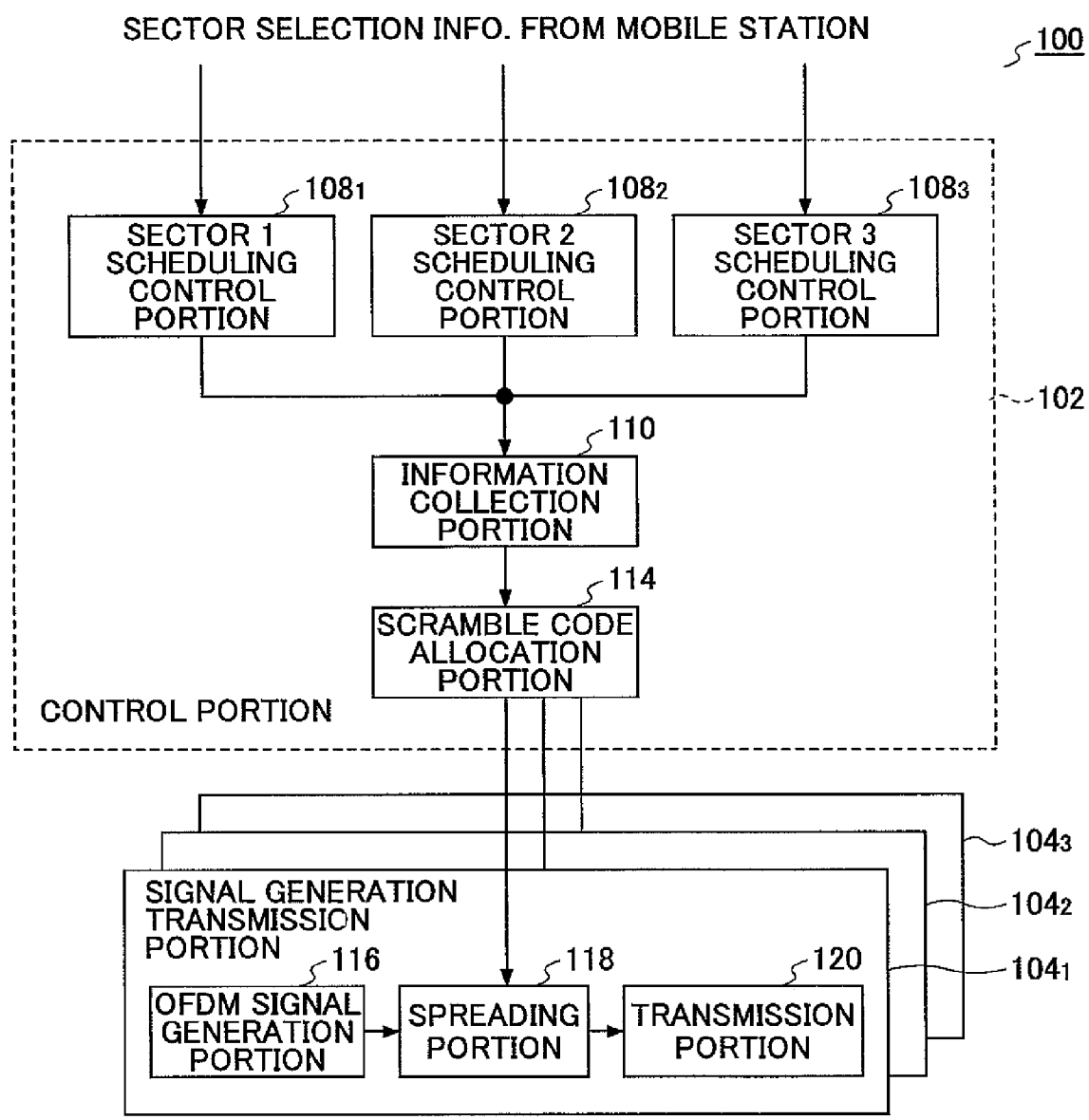
FIG. 12 is a partial block diagram illustrating a mobile station according to one example of the present invention.

The operation of the base station 100 is described referring to FIG. 11.

The information indicating reception the quality transmitted from the mobile station 200 is received in the base station 100 and then input to the sector 1 scheduling control portion $108_1$ and the sector 2 scheduling control portion $108_2$ (step S1002). Here, as the reception quality, there may be used the reception quality in each sector, for example, reception power or received SINR; the reception quality after synthesis of the signals from the two sectors, for example, reception power or received SINR; or the reception quality of the optimal sector, which has better reception quality, for example, reception power or received SINR.

Next, the sector 1 scheduling control portion $108_1$ and the sector 2 scheduling control portion $108_2$ perform scheduling based on the input reception quality (step S1004).

Then, the information collection portion 110 collects the information regarding the selected user and the information on the scramble codes being used in each sector. The transmission sector determination portion 112 selects the sector that is to transmit to the handover user (step S1006), and determines whether plural sectors are selected (step S1008).

When plural sectors are selected (step S1008: YES), the transmission sector determination portion 112 outputs the information indicating the selected sectors to the scramble code allocation portion 114. In this case, the scramble code allocation portion 114 outputs to the spreading portion 118 of, for example, the signal generation and transmission portion $104_1$ corresponding to the handover original sector, i.e., the sector 1 information indicating the scramble code being used. In addition, the scramble code allocation portion 114 outputs to the spreading portion 118 of, for example, the signal generation and transmission portion $104_2$ corresponding to the handover destination sector, i.e., the sector 2 information indicating the scramble code that is the same as the scramble code being used in the handover original sector (step S1010). The signal generation and transmission portion $104_1$ and the signal generation and transmission portion $104_2$ perform spreading using the scramble codes input from the corresponding scramble code allocation portions 114. Then, transmissions are carried out from at least two sectors (step S1012). The mobile station 200 receives the received signals from the transmission sectors using the identical scramble codes for recognizing the sectors at the reception portion (not shown) of the mobile station 200.

On the other hand, when plural sectors are not selected, namely when no sectors are selected or one sector is selected (step S1008: NO), the transmission sector determination portion 112 outputs the information indicating the sector to the scramble code allocation portion 114.

The scramble code allocation portion 114 selects a predetermined scramble code out of scramble codes allocated for the sector indicated in the received information and outputs the information indicating the scramble code to the signal generation and transmission portion 104. The signal generation and transmission portion 104 performs spreading using the scramble code input from the scramble code allocation portion 114 so as to perform transmission (step S1014).

According to the mobile communications system of this example, the optimal transmission user can be selected using the information on each sector.

In addition, the allocation to the optimal user can be carried out in each sector, thereby increasing throughput.

Although the OFDM method is employed in this example, the sector 1 scheduling control portion 108$_1$, the sector 2 scheduling control portion 108$_2$, the sector 3 scheduling control portion 108$_3$ and the transmission sector determination portion 112 can operate in the aforementioned manner even under other communications methods and demonstrate the same effects.

Next, a mobile communications system according to a fifth example is described.

The mobile communications system according to this example performs the fast sector selection and then the packet scheduling. In this case, the mobile station 200 selects an optimal sector based on the measured reception quality. Additionally, the base station 100 carries out the packet scheduling in the sector determined by the mobile station 200.

Also in this example, the base station 100 divides the cell into three sectors, for example, a sector 1, a sector 2, and a sector 3 and controls these sectors. However, the base station 100 may divide the cell into a different number of sectors.

The base station 100 as a control apparatus according to this example is configured by eliminating the transmission sector determination portion 112 from the base station described for the second example and connecting the information collection portion 110 and the scramble code allocation portion 114.

The sector 1 scheduling control portion 108*l*, the sector 2 scheduling control portion 108$_2$, and the sector 3 scheduling control portion 108$_3$ confirm based on sector selection information transmitted from the mobile station whether the corresponding sectors are selected as the transmission sector. When determined to be selected, the sector scheduling control portion corresponding to the selected sector determines a user subjected to transmission allocation based on the aforementioned various algorithms so as to perform scheduling, and outputs the result to the information collection portion 110.

The information collection portion 110 collects the information indicating the user subjected to transmission allocation and outputs the information to the scramble code allocation portion 114.

The scramble code allocation portion 114 outputs the scramble code to the spreading portion 118 of the signal generation and transmission portion 104 corresponding to the sector for the transmission.

Figure 13:
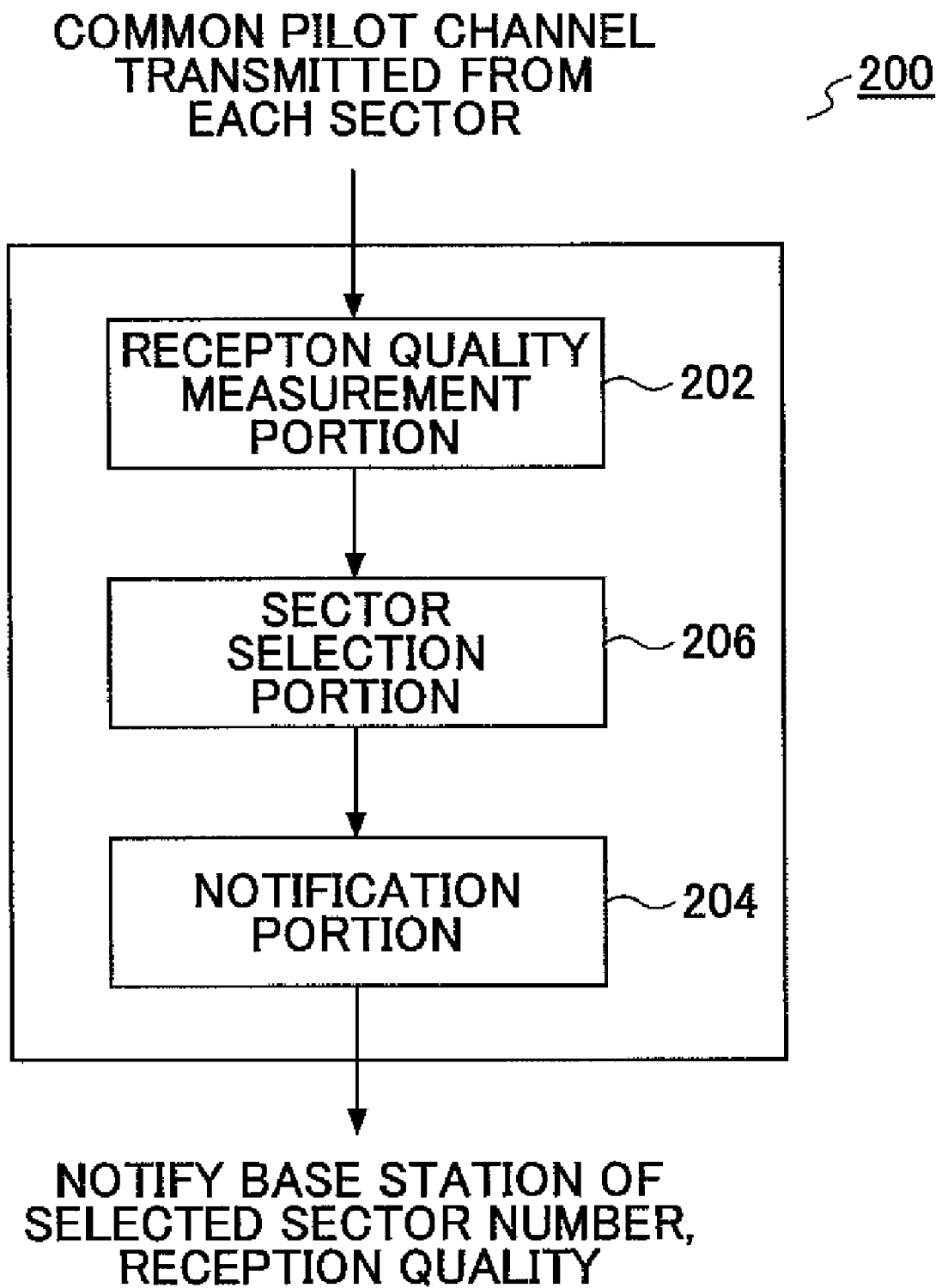
FIG. 13 is a partial block diagram illustrating a mobile station according to one example of the present invention.

Next, the mobile station 200 according to this example is described in reference to FIG. 13.

The mobile station 200 according to this example includes the reception quality measurement portion 202 which receives a common pilot channel (reference signal) transmitted from each sector, a sector selection portion 206 connected to the reception quality measurement portion 202, and the notification portion 204 connected to the sector selection portion 206.

The reception quality measurement portion 202 measures the reception quality using, for example, a common pilot channel transmitted from each sector and outputs the result to the sector selection portion 206.

The sector selection portion 206 selects an optimal sector based on the input reception quality and outputs the information indicating the selected sector (sector selection information), in addition to the information indicating the reception quality, to the notification portion 204. Namely, the reception quality to be transmitted is the reception quality, for example, reception power or received SINR, of the optimal sector.

The notification portion 204 notifies the base station of the information indicating the selected sector, for example, a sector number and the reception quality.

Figure 14A:
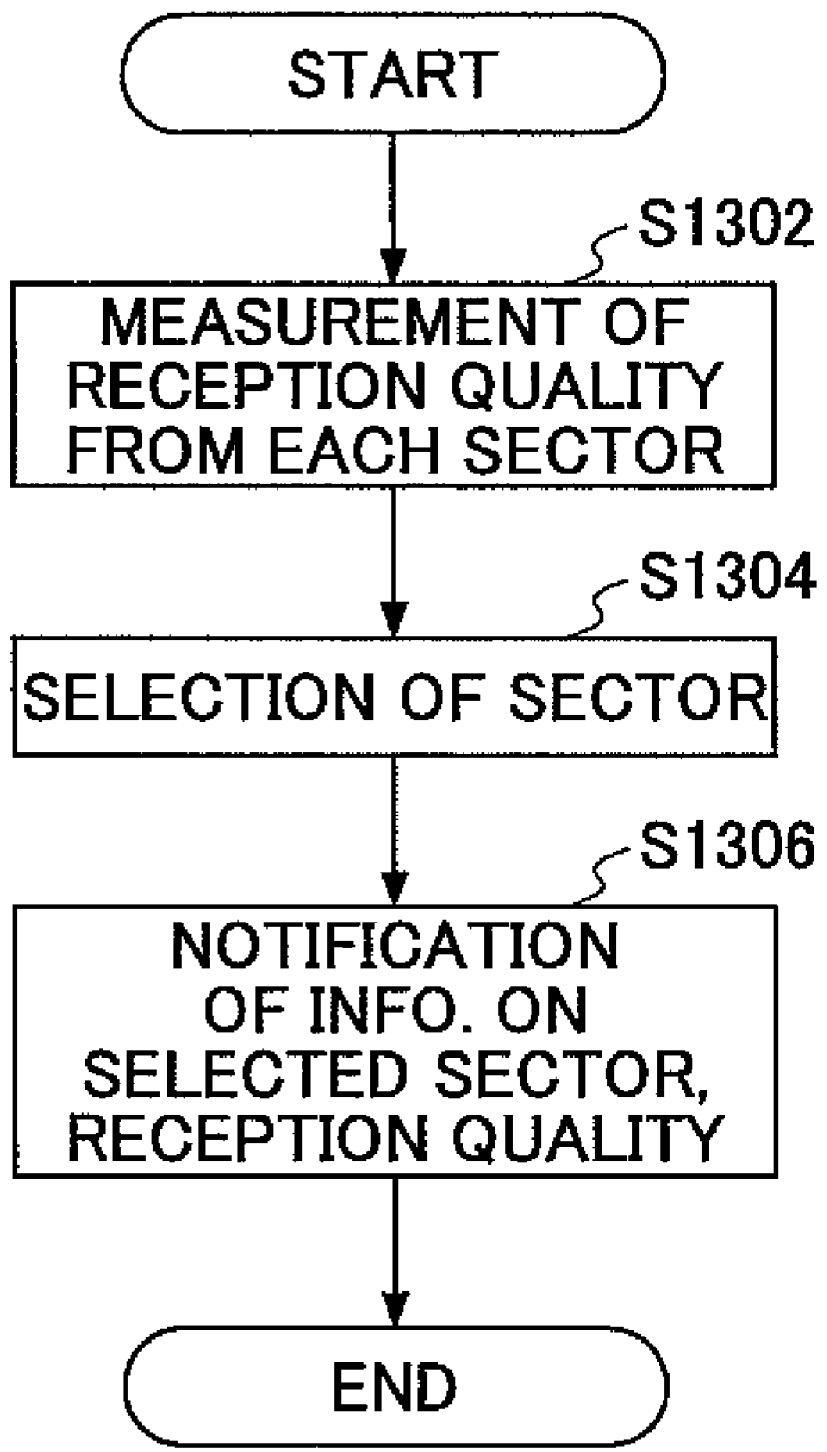
FIG. 14A is a flowchart illustrating operations of a mobile station according to one example of the present invention.
Figure 14B:
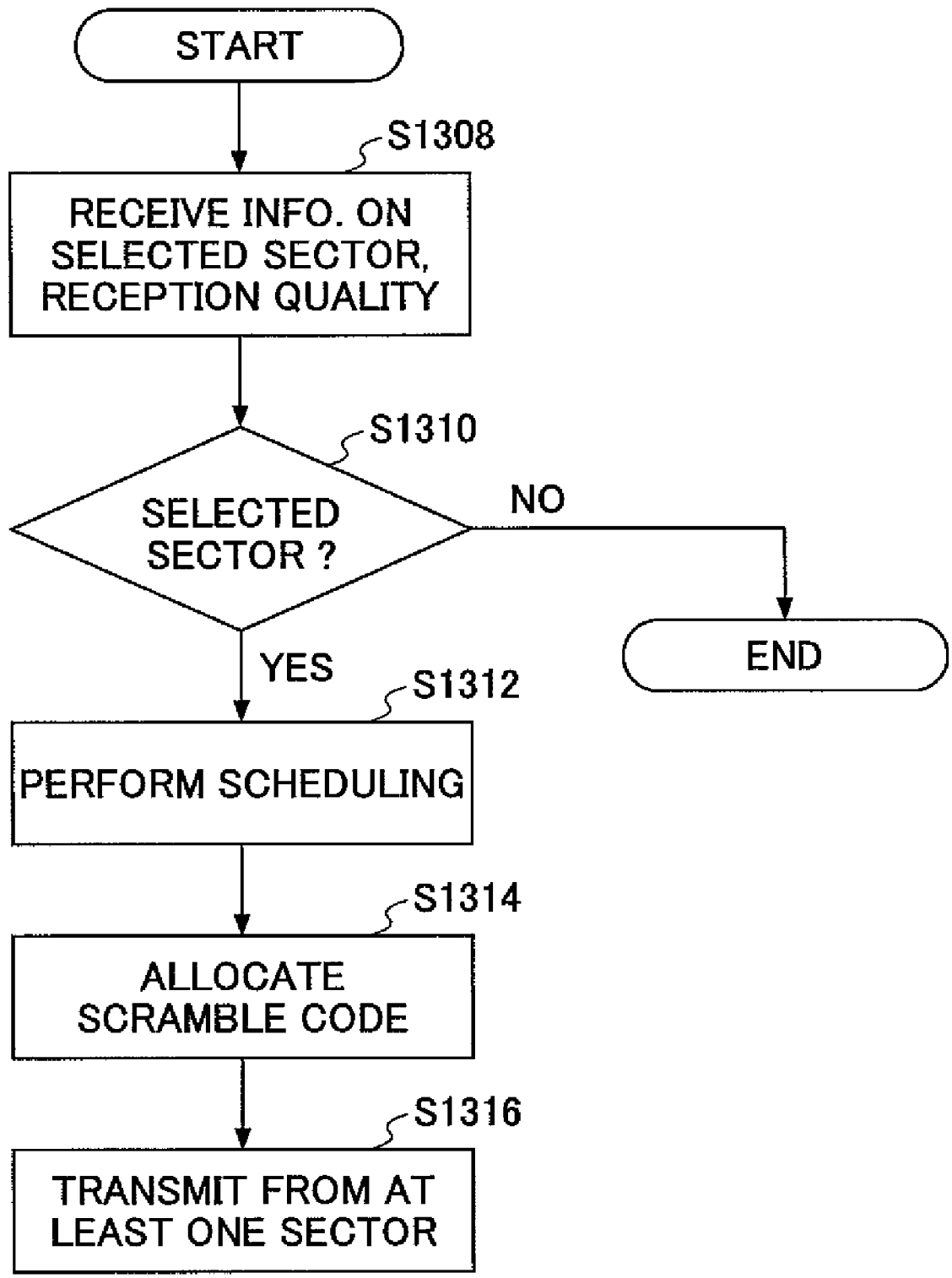
FIG. 14B is a flowchart illustrating operations of a base station according to one example of the present invention.

Next, there is described how the mobile communications system according to this example operates, referring to FIGS. 14A and 14B, where the mobile station 200 exists at and around the boundary between the sector 1 and the sector 2.

First, the operation of the mobile station 200 is described referring to FIG. 14A.

The reception quality measurement portion 202 measures the reception quality based on the common pilot channels from individual sectors (step S1302).

Then, the sector selection portion 206 selects an optimal sector based on the reception quality (step S1304).

Next, the notification portion 204 notifies the base station 100 of the selected sector and the information indicating the reception quality of the selected sector (step S1306).

Referring to FIG. 14B, the operation of the base station 100 is described.

The information indicating the selected sector transmitted from the mobile station 200 and the reception quality is received by the base station 100 and then input to the sector 1 scheduling control portion 108$_1$ and the sector 2 scheduling control portion 108$_2$ (step S1308).

Next, the sector 1 scheduling control portion 108$_1$ and the sector 2 scheduling control portion 108$_2$ determine whether the corresponding sectors are selected (step S1310).

The sector 1 scheduling control portion 108$_1$ and the sector 2 scheduling control portion 108$_2$, when having determined that the sector thereof is selected (step S1310: YES), perform scheduling (step S1312).

Next, the information collection portion 110 collects the information on the selected user and the information on the scramble code being used in the selected sector. The scramble code allocation portion 114 allocates a scramble code based on the collected information, and outputs the scramble code to the signal generation and transmission portion 104 (step S1314). The signal generation and transmission portion 104$_1$ and the signal generation and transmission portion 104$_2$ perform spreading using the scramble codes input from the scramble code allocation portion 114. Then, the transmission is carried out from at least one sector (step S1316).

On the other hand, the signal generation and transmission portion 104$_1$ and the signal generation and transmission portion 104$_2$, when having determined that the corresponding sector is not selected, perform nothing and the procedures are completed (step S1310: NO).

According to the mobile communications system of this example, when the user enjoying the best reception quality is selected among the mobile stations, control straddling the sectors is not necessary, thereby providing a simple control method. In addition, the sector may only examine whether the corresponding sector is selected. Moreover, the handover throughput can be improved.

Furthermore, information fed back from the mobile station 200 to the base station 100 can be reduced.

Although the OFDM method is employed in this example, the sector 1 scheduling control portion 108$_1$, the sector 2 scheduling control portion 108$_2$, and the sector 3 scheduling control portion 108$_3$ can be applied to other communications methods and demonstrate the same effects.

Next, a mobile communications system according to a sixth example is described.

The mobile communications system according to this example uses common pilot channels orthogonal to each other between the sectors, while having the features of the aforementioned examples.

Figure 15A:
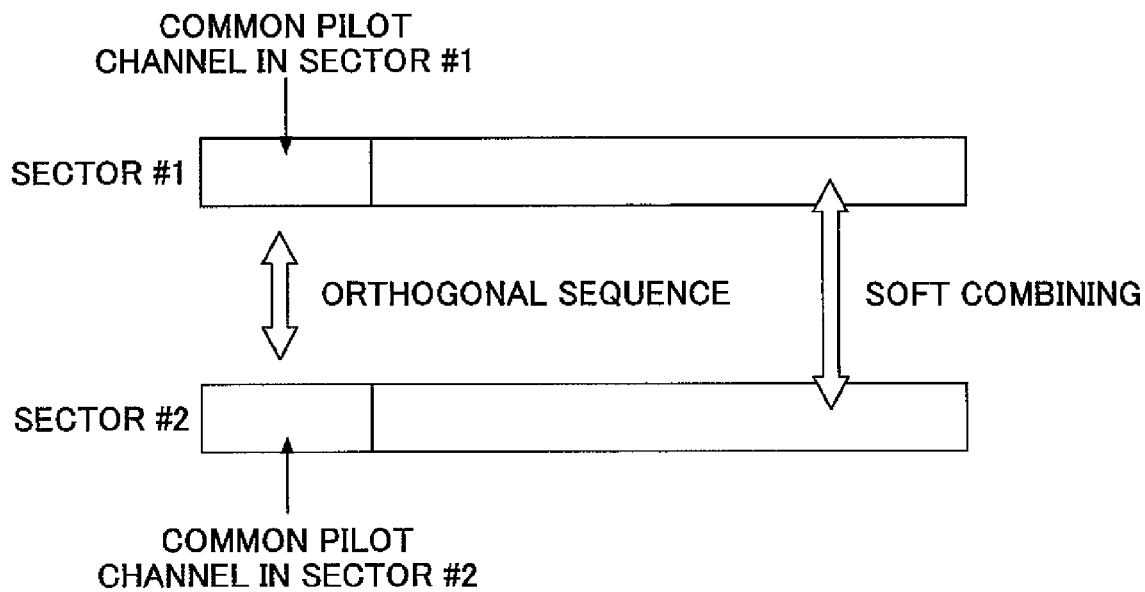
FIG. 15A is an explanatory view illustrating a common pilot channel (reference signal) using orthogonal sequences.
Figure 15B:
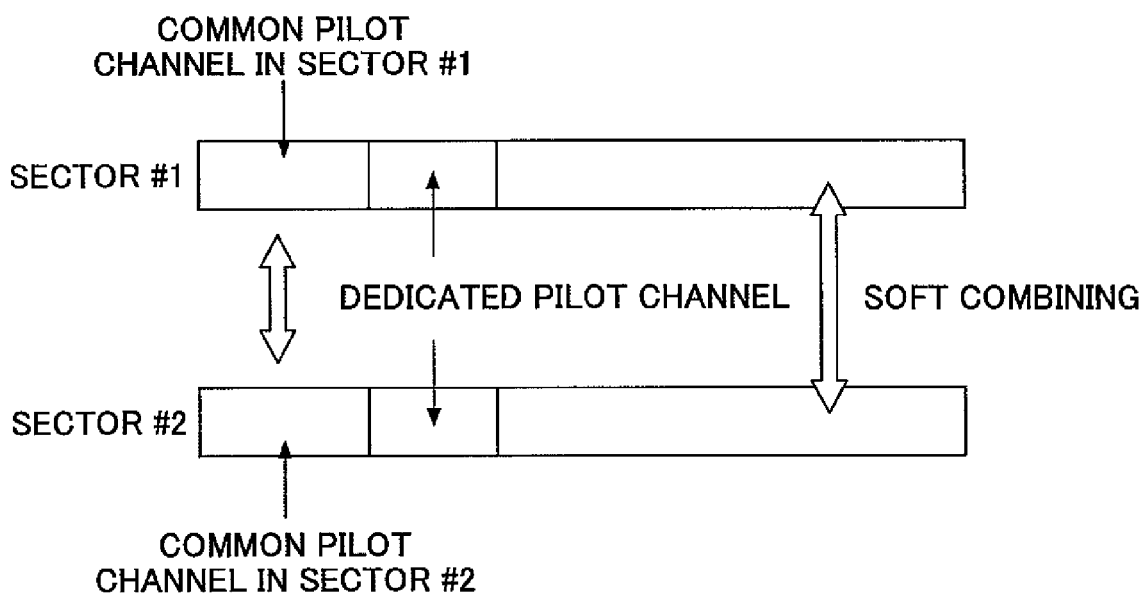
FIG. 15B is an explanatory view illustrating dedicated pilot channels (reference signals)

Referring to FIG. 15A, a method of using orthogonal symbol sequences in a sector of the same cell site is described.

FIG. 15A illustrates pilot channels that are made orthogonal using orthogonal symbols, and data channels in signals of both the sector #1 and the sector #2. The data channels are the same and received through the soft-combining.

The data channels are received with twice the reception power. On the other hand, the common pilot channels are independently received when they are not made orthogonal. For example, when the common pilot channel from the sector #1 is received, the common pilot channel from the sector #2 works as interference. Similarly, when the common pilot channel from the sector #2 is received, the common pilot channel from the sector #1 works as interference. Therefore, the reception quality is impaired.

On the other hand, when orthogonal sequences are used for the common pilot channels, the reception quality of the common pilot channel from the sector 1 and the reception quality of the common pilot channel from the sector 2 are improved. Therefore, they can be used for reception quality measurement.

When spreading symbols peculiar to a sector are used in OFDM downlink, the pilot channel is subjected to inter-sector interference due to inter-symbol interference since sub-carriers and sub-frames have the same symbols in the sector. In order to address the inter-sector interference, dedicated pilot channels (reference signals) may be used as pilot channels, in addition to the common pilot channels. For the dedicated pilot channels, orthogonal sequences peculiar to the sector are used. This enables the dedicated pilot channels to circumvent the interference from adjacent sectors in the same cell. Therefore, channel estimation accuracy is improved, which is especially advantageous for simultaneous transmissions relating to the fast sector selection and the soft-combining.

A specific usage of the orthogonal sequences peculiar to the sector is as follows, for example. The user #1, which is located at an edge or an end portion of the sector and subjected to the fast sector selection or the soft-combining, can realize an accurate channel estimation due to the despreading of the orthogonal sequences.

The user #2 that is not subjected to the fast sector selection or the soft-combining can use each pilot symbol to perform the channel estimation. In other words, no spreading is necessary.

In a conventional W-CDMA, scrambling is carried out using different spreading symbols in each sector. When the fast handover or movement over sectors occurs often, it takes a longer time to accurately perform the channel estimation or cell search, since the spreading symbols in the pilot used for the channel estimation are set in a random manner. On the other hand in this example, symbolization is realized for not each sector but each cell using the orthogonal symbols and thus the pilot signals are transmitted. The terminal performing the handover at sector edges performs the channel estimation simultaneously based on the pilots from the two base stations, which enables fast and accurate channel estimation. The orthogonal pilot sequences are used between the sectors (or beams) in such a manner.

In addition, as stated above, the dedicated pilot channels may be added in addition to the common pilot channels.

Moreover, the aforementioned common pilot channels and dedicated pilot channels can be applied to the aforementioned first to fifth examples.

Figure 16:
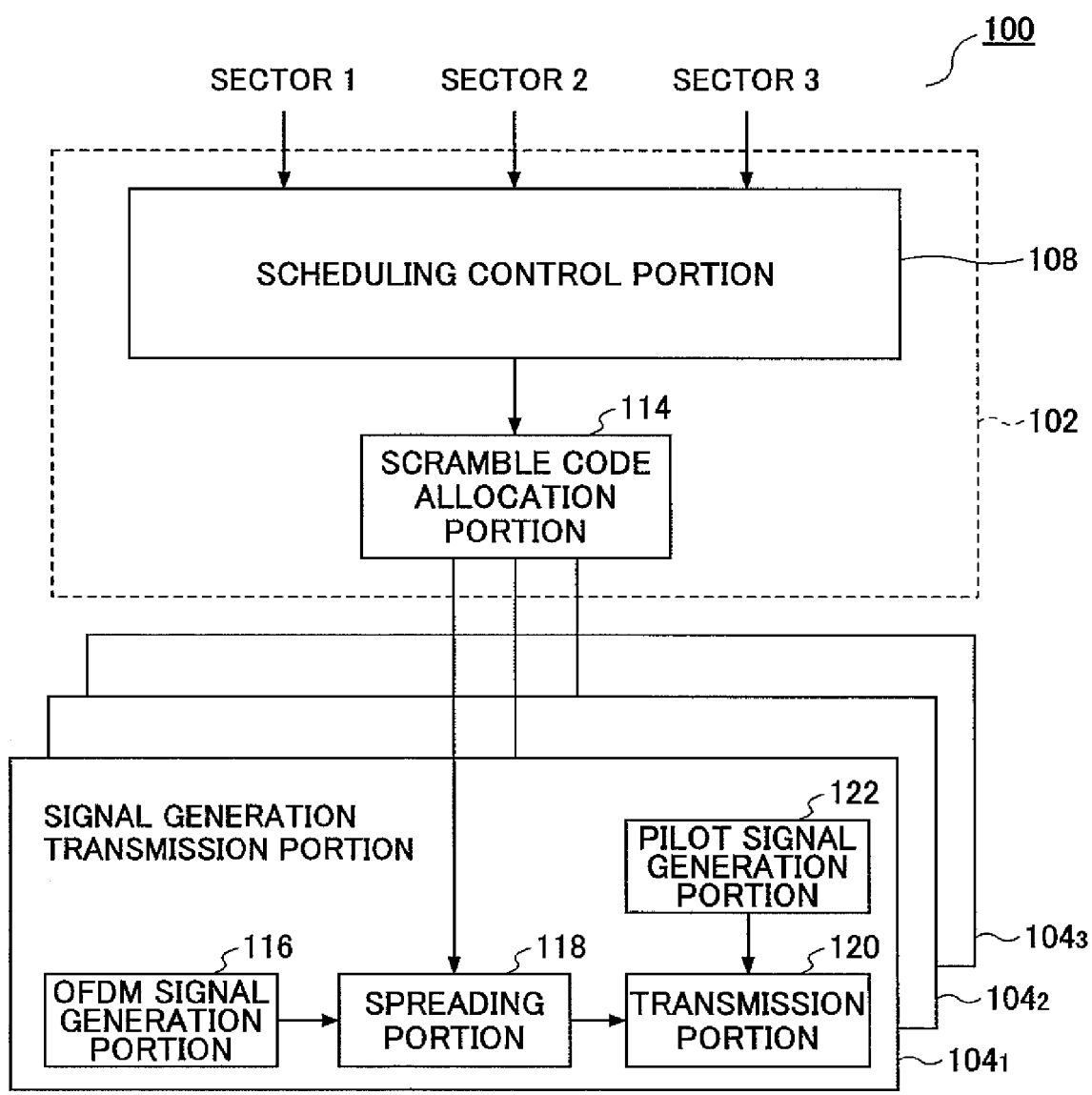
FIG. 16 is a partial block diagram illustrating a base station according to one example of the present invention.

Next, the base station too as a control apparatus according to this example is described, in reference to FIG. 16.

The base station 100 as a control apparatus according to this example includes the scheduling control portion 108, the scramble code allocation portion 114 connected to the scheduling control portion 108, and the signal generation and transmission portions $104_1$, $104_2$, $104_3$.

The signal generation and transmission portions $104_1$, $104_2$, $104_3$ have the same configuration, namely, the spreading portion 118 connected to the scramble code allocation portion 114, the OFDM signal generation portion 116 connected to the spreading portion 118, the transmission portion 120 connected to the spreading portion 118, and the pilot signal generation portion 122 connected to the transmission portion 120.

The scheduling control portion 108 allocates frequency blocks obtained by dividing the allocated frequency band to mobile stations based on the reception qualities of all the mobile stations that exist in plural sectors of the same base station, and selects a mobile station that performs transmission. In other words, the scheduling control portion 108 allocates frequency blocks obtained by dividing the allocated frequency band to mobile stations based on the reception qualities in plural sectors of the same base station, and selects a mobile station that performs transmission. Namely, a priority function for use in each frequency block is measured for all the users that exist in the sectors of the same base station, and the frequency blocks are allocated to the users based on the measured priority function.

The pilot signal generation portion 122 generates the orthogonal pilot channels shared by each sector as stated above. In addition, the pilot signal generation portion 122 may generate a pilot channel including the dedicated pilot channel, in addition to the common pilot channel Next, the mobile station 200 according to this example is described. The mobile station 200 according to this example has the same configuration as the mobile station described in reference to FIG. 3.

Figure 17:
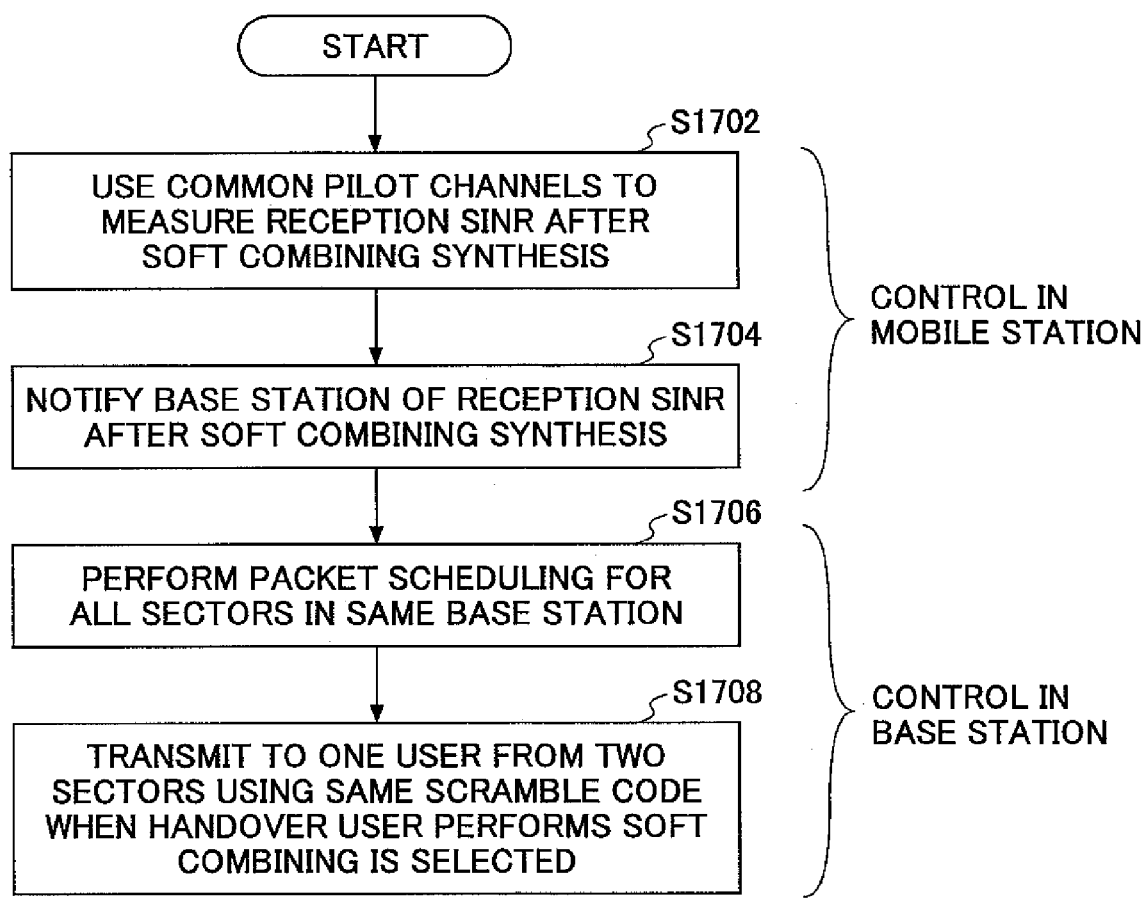
FIG. 17 is a flowchart illustrating operations of a mobile communications system according to one example of the present invention.
Figure 18:
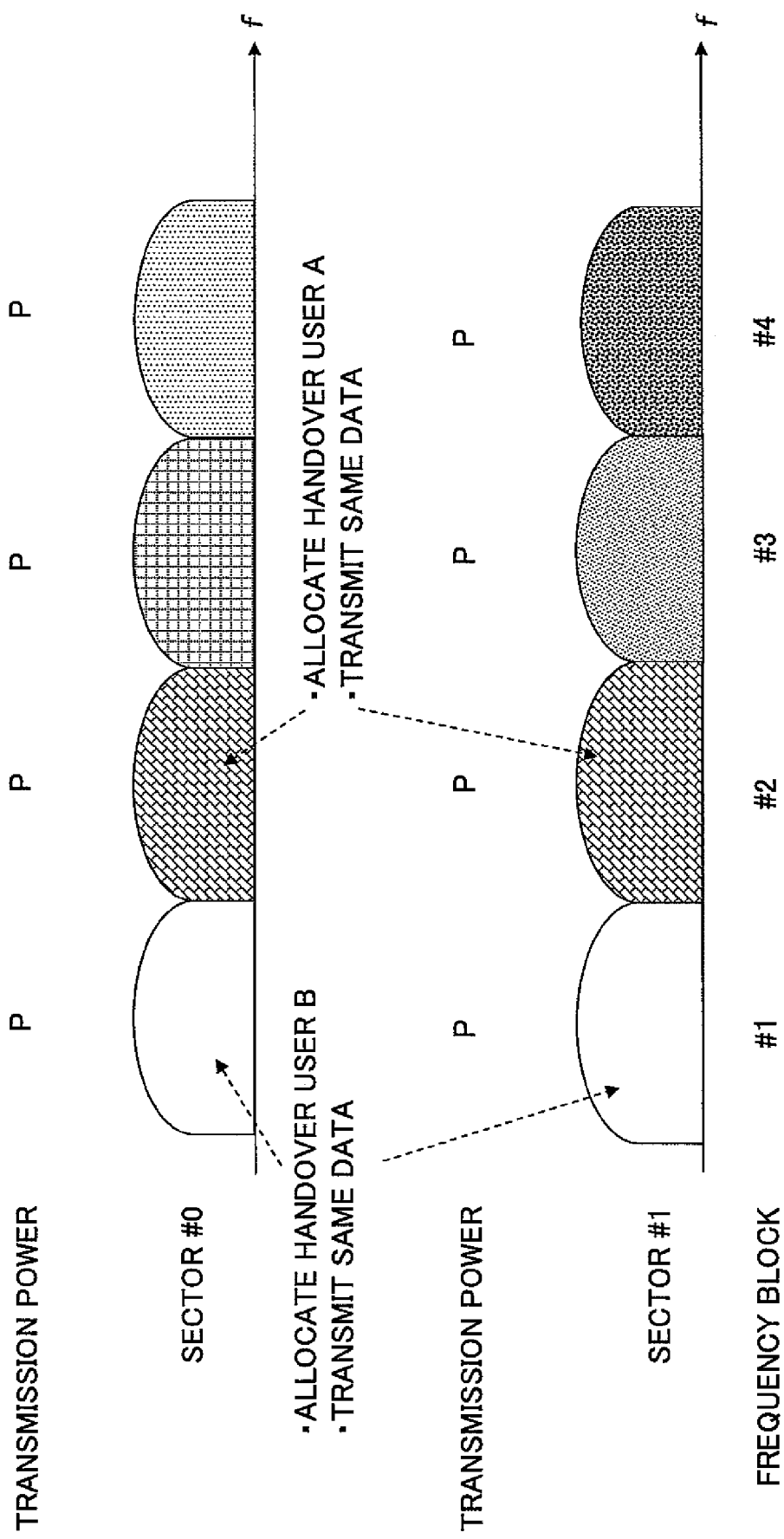
FIG. 18 is an explanatory view illustrating frequency block allocation to a handover user.

Next, the mobile communications system according to this example is described in reference to FIG. 17.

First, the mobile station 200 uses the common pilot channel transmitted from the base station 100 to measure received SINR after soft-combining, at the reception quality measurement portion 202 (step S1702).

Next, the notification portion 204 of the mobile station 200 notifies the base station of the received SINR after soft-combining (step S1704).

Next, the base station 100 performs in the scheduling control portion 108 the packet scheduling for all the sectors of the same base station (step S1706).

Figure 19:
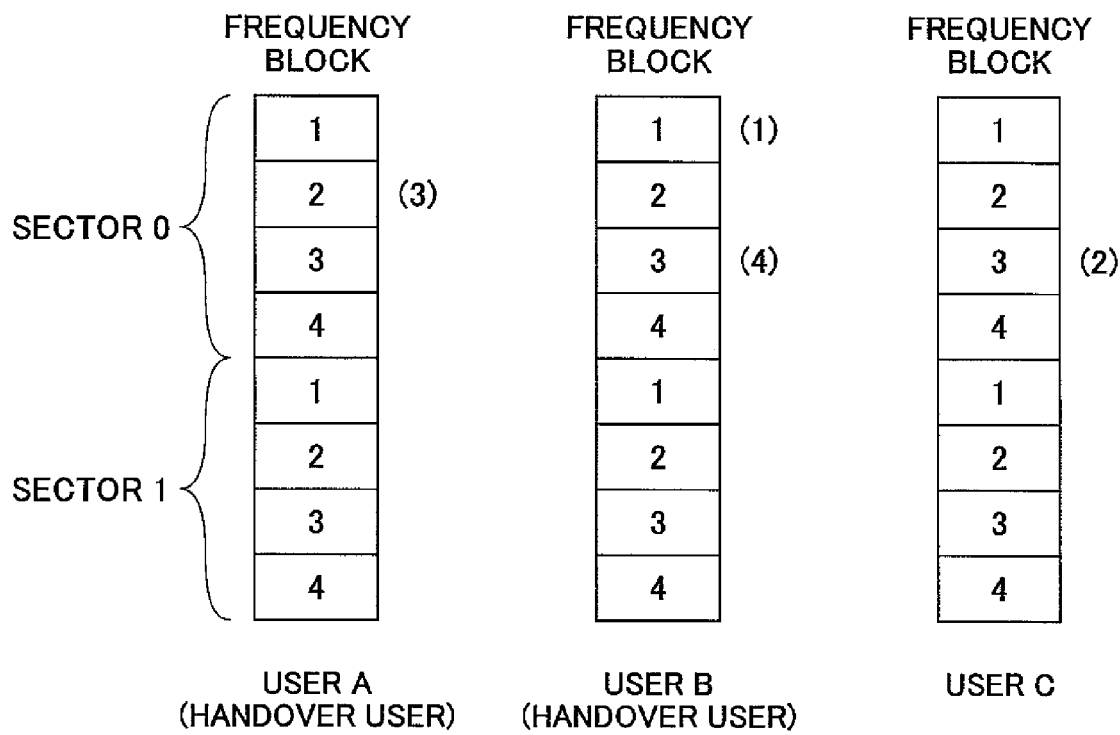
FIG. 19 is an explanatory view illustrating frequency block allocation to a handover user.

Here, the procedures in the scheduling control portion 108 are specifically described in reference to FIG. 19.

In this example, the frequency band allocated to the system is divided into four frequency blocks, and a radio resource is allocated to each frequency block. However, the frequency band allocated to the system may be divided into a different number of frequency blocks, and a radio resource is allocated to each frequency block.

The scheduling control portion 108 measures the priority function to be used for scheduling in each frequency block for all the users that exist in all the sectors of the same base station.

For example, as the priority function, there can be used a maximum CIR (see, non-patent document 3) and proportional fairness (see, non-patent document 4).

Next, the scheduling control portion 108 sorts out the measured priority functions in a predetermined order. For example, the scheduling control portion 108 sorts the frequency blocks in the descending order of values of the priority functions. Such an order is, as shown in FIG. 19, a frequency block 1 in a sector 0 for a user B, a frequency block 3 in the sector 0 for a user C, a frequency block 2 in the sector 0 for a user A, and the frequency block 3 in the sector 0 for the user B.

Next, the scheduling control portion 108 allocates the frequency blocks to the users in the descending order of the values of the priority functions. In this case, when a certain frequency block is to be allocated to a handover user, the frequency block is allocated to the same handover user if no user is allocated to the corresponding frequency block in another sector. Namely, when the frequency blocks having substantially the same frequency band in the two sectors can be used for a handover user, the allocation is carried out. In other words, when frequency blocks which are in different sectors and correspond to each other can be allocated, the allocation is carried out. As a result, the frequency blocks having the same frequency band in each sector are allocated to the handover user.

For example, when the frequency block 1 in the sector 0 is allocated to the handover user B, since the frequency block 1 in the sector 1 is not allocated, the frequency blocks 1 are allocated to the user B.

When the frequency blocks having the same frequency band in both sectors are not allocated, no allocation is carried out for the time being. Such an allocation is carried out by time and by packet.

Next, when the handover user performing the soft-combining is selected, the two sectors perform transmission to one user using the same scramble code (step S1708).

Until now, there has been described a situation where the handover is performed when the frequency blocks are allocated to users independently in each sector and the corresponding frequency blocks are allocated. Since the frequency blocks are allocated to each user (mobile station) based on the reception quality in the plural sectors, allocation of the corresponding frequency blocks in both sectors is ensured.

Figure 20A:
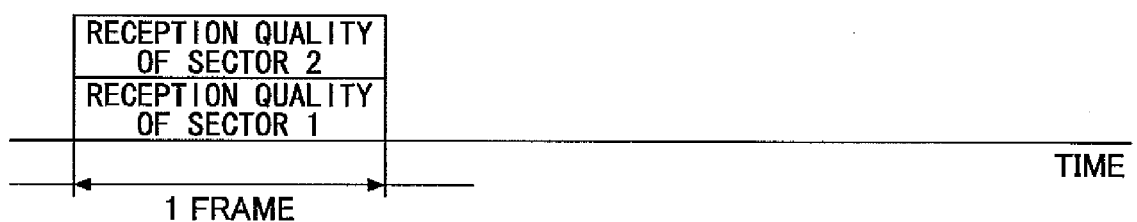
FIG. 20A is an explanatory view illustrating a transmission method of transmitting information indicating reception quality.
Figure 20B:
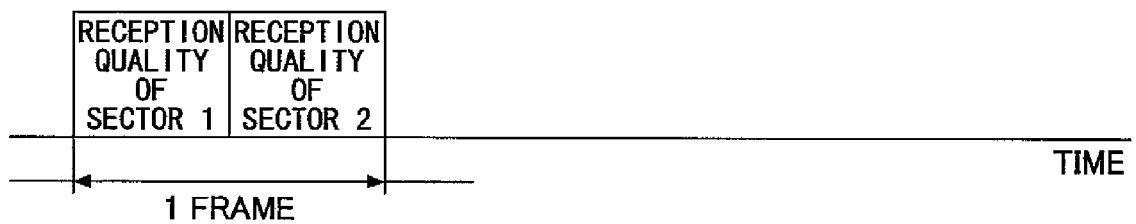
FIG. 20B is another explanatory view illustrating a transmission method of transmitting information indicating reception quality.
Figure 20C:
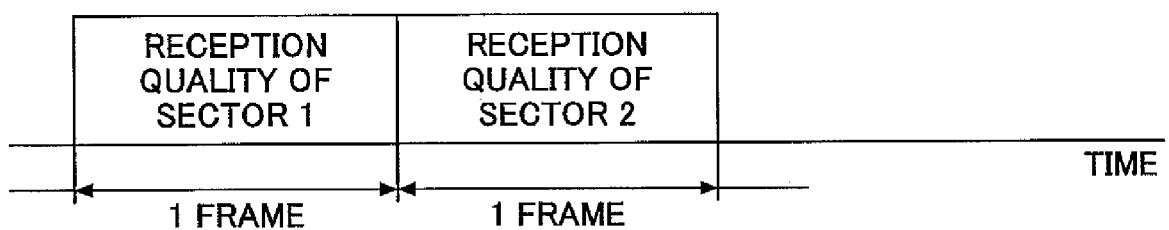
FIG. 20C is another explanatory view illustrating a transmission method of transmitting information indicating reception quality.

Referring to FIGS. 20A, 20B, and 20C, there is described how the mobile station 200 transmits the reception quality or the like to the base station 100 in the above examples.

As shown in FIG. 20A, the reception qualities in corresponding individual sectors are code divisionally multiplexed and then transmitted in the same frame, which enables simultaneous transmission of the reception qualities of the two sectors.

On the other hand, the reception qualities of individual sectors may be time divisionally multiplexed and then transmitted. For example, as shown in FIG. 20B, one frame is halved so as to shorten a transmission time of the reception quality of each sector, while maintaining the time frame. Furthermore, as shown in FIG. 20C, after the reception quality of the sector 1 is transmitted, the reception quality of the sector 2 is transmitted, while maintaining the time frame, which prevents quality of the control information from being impaired. In addition, when a frame does not contain the reception quality, the reception quality transmitted previously is used.

According to the above examples, since control straddling the sectors can be performed in the same base station, no control delay taking place between the base station and the upper station is caused, thereby enabling the fast packet scheduling.

The time required for selecting the packet scheduling and the sector selection can be reduced based on the instantaneous reception quality, thereby improving the capacity (sector throughput) and the user throughput.

Although a handover within one base station is described as an example in the aforementioned examples, when plural base stations are configured to autonomously transmit control information mutually so that other base stations can share the sector information, a handover between the base stations can be realized.

When two transmission sectors are selected in this case, the selection may include sectors A and B in one base station (cell), or a sector A in a base station 1 and a sector B in a base station 2.

This international patent application is based on Japanese Priority Applications No. 2005-105496 and No. 2005-241903, filed on Mar. 31, 2005 and Aug. 23, 2005, respectively, with the Japanese Patent Office, the entire contents of which are hereby incorporated by reference.

INDUSTRIAL APPLICABILITY

A control apparatus, a mobile station, a mobile communications system, and a control method according to the present invention are applicable to the mobile communications system performing communications through IP packets.

The invention claimed is:

1. A control apparatus that performs packet communications with a mobile station and divides a coverage area into plural sectors so as to control the communications, the control apparatus comprising:
    a scheduling portion that selects a mobile station to which transmission is to be performed in each sector in accordance with a reception quality synthesized among sectors and imparted by the mobile station;
    a sector determination portion that selects a sector through which transmission is to be performed for the mobile station, the mobile station being selected in more than one sector by the scheduling portion;
    a scramble code selection portion that selects a scramble code to be allocated to the mobile station to which transmission is to be performed out of scramble codes allocated in advance for each sector; and
    a transmission portion that spreads transmission data using the scramble code selected by the scramble code selection portion and transmits the transmission data,
    wherein when handover is carried out for the mobile station for which the more than one sector is selected by the sector determination portion, the scramble code selection portion selects the scramble code for the mobile station for which the more than one sector is selected, the scramble code being the same as a scramble code used in a handover original sector,
    wherein when the handover is completed, the scramble code selection portion selects the scramble code that is used in a handover destination sector.

2. The control apparatus of claim 1, wherein
    the sector determination portion selects a single sector through which transmission is to be performed for the mobile station, the mobile station being selected in the more than one sector by the scheduling portion.

3. The control apparatus of claim 1, wherein
    the scheduling portion selects a mobile station to which a frequency block obtained by dividing a frequency band allocated to a system is to be allocated in accordance with the reception qualities in all mobile stations that exist in the plural sectors.

4. The control apparatus of claim 3, wherein the scheduling portion allocates the frequency block having an identical frequency band each sector to a mobile station carrying out handover.

5. The control apparatus of claim 1, further comprising a common pilot channel generation portion that generates a common pilot channel composed of sequences orthogonal between sectors.

6. The control apparatus of claim 1, further comprising a dedicated common pilot channel generation portion that generates a dedicated pilot channel composed of sequences orthogonal between sectors.

7. A mobile communications system comprising:
a mobile station; and
a base station that performs packet communications with the mobile station,
wherein the base station comprises
a scheduling portion that selects a mobile station to which transmission is to be performed in each sector in accordance with reception quality synthesized among sectors and imparted from the mobile station;
a sector determination portion that selects a sector through which transmission is to be performed for the mobile station, the mobile station being selected in more than one sector by the scheduling portion;
a scramble code selection portion that selects a scramble code to be allocated to the mobile station to which transmission is to be performed out of scramble codes allocated in advance for each sector; and
a transmission portion that spreads transmission data using the scramble code selected by the scramble code selection portion and transmits the transmission data; and
wherein the mobile station comprises
a reception quality measurement portion that measures reception quality in each sector covered by the base station; and
a notification portion that synthesizes the reception quality in each sector measured by the reception quality measurement portion and imparts to the base station,
wherein when handover is carried out for the mobile station for which the more than one sector is selected by the sector determination portion, the scramble code selection portion selects the scramble code for the mobile station for which the more than one sector is selected, the scramble code being the same as a scramble code used in a handover original sector,
wherein when the handover is completed, the scramble code selection portion selects the scramble code that is used in a handover destination sector.

8. A control method in a mobile communications system including a mobile station and a base station performing packet communications with the mobile station, comprising:
a reception quality measurement step of measuring, by the mobile station, reception quality in each sector covered by the base station;
a notification step of synthesizing, by the mobile station, the reception quality in each sector measured in the reception quality measurement step and imparting to the base station;
a scheduling step of selecting, by the base station, a mobile station to which transmission is to be performed in each sector in accordance with the reception quality synthesized among sectors and imparted by the mobile station;
a sector determination step of selecting, by the base station, a sector through which transmission is to be performed for the mobile station, the mobile station being selected in more than one sector in the scheduling step;
a scramble code selection step of selecting, by the base station, a scramble code to be allocated to the mobile station to which transmission is to be performed out of scramble codes allocated in advance for each sector; and
a transmission step of spreading, by the base station, transmission data using the scramble code selected in the scramble code selection step and transmitting the transmission data,
wherein when handover is carried out for the mobile station for which the more than one sector is selected in the sector determination step, the scramble code selection step comprises selecting the scramble code for the mobile station for which the more than one sector is selected, the scramble code being the same as a scramble code used in a handover original sector,
wherein when the handover is completed, the scramble code selection step comprises selecting the scramble code that is used in a handover destination sector.

9. The control method of claim 8, wherein in the reception quality measurement step, a received SINR is measured.

10. The control method of claim 8, wherein in the scheduling step, the base station selects a mobile station to which a frequency block obtained by dividing a frequency band allocated to a system is to be allocated in accordance with reception qualities of all mobile stations that exist in plural sectors.

11. The control method of claim 10, wherein the scheduling step includes a step of allocating a frequency block having an identical frequency band in each sector to a mobile station carrying out handover.

12. The control method of claim 8, further comprising a common pilot channel generation step of generating, by the base station, a common pilot channel composed of orthogonal sequences between the sectors; and
a common pilot channel transmission step of transmitting, by the base station, the common pilot channel generated in the common pilot channel generation step;
wherein in the reception quality measurement step, reception quality of the common pilot channel is measured.

13. The control method of claim 8, further comprising a dedicated pilot channel generation step of generating, by the base station, a dedicated pilot channel composed of orthogonal sequences between the sectors; and
a dedicated pilot channel transmission step of transmitting, by the base station, the dedicated pilot channel generated in the dedicated pilot channel generation step;
wherein in the reception quality measurement step, reception quality of the dedicated pilot channel is measured.

14. The control apparatus of claim 1, wherein the sector determination portion selects all the sectors through which transmission is to be performed for the mobile station, the mobile station being selected in a single sector by the scheduling portion, and
the scramble code selection portion selects an identical scramble code for the mobile station for which all the sectors are selected.

* * * * *